United States Patent
Park et al.

(10) Patent No.: US 12,206,503 B2
(45) Date of Patent: Jan. 21, 2025

(54) METHOD FOR TERMINAL TO TRANSMIT AND RECEIVE SIGNAL IN WIRELESS COMMUNICATION SYSTEM

(71) Applicant: LG ELECTRONICS INC., Seoul (KR)

(72) Inventors: Giwon Park, Seoul (KR); Jongyoul Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 334 days.

(21) Appl. No.: 17/642,069

(22) PCT Filed: Sep. 25, 2020

(86) PCT No.: PCT/KR2020/013084
§ 371 (c)(1),
(2) Date: Mar. 10, 2022

(87) PCT Pub. No.: WO2021/060921
PCT Pub. Date: Apr. 1, 2021

(65) Prior Publication Data
US 2022/0385409 A1 Dec. 1, 2022

(30) Foreign Application Priority Data
Sep. 25, 2019 (KR) .................. 10-2019-0118404

(51) Int. Cl.
*H04L 1/18* (2023.01)
*H04L 1/1812* (2023.01)
*H04W 92/18* (2009.01)

(52) U.S. Cl.
CPC .......... *H04L 1/1812* (2013.01); *H04W 92/18* (2013.01)

(58) Field of Classification Search
CPC ... H04W 28/04; H04W 72/04; H04W 72/042; H04W 88/08; H04W 92/18; H04L 5/0007; H04L 1/1812
(Continued)

(56) References Cited

U.S. PATENT DOCUMENTS 11,616,629 B2 * 3/2023 Kim .................. H04L 27/2607 370/329
11,671,203 B2 * 6/2023 Lee .................. H04L 1/1812 370/329

(Continued)

OTHER PUBLICATIONS

3GPP TSG RAN WG1 Ad-Hoc Meeting 1901, Taipei, Taiwan, Jan. 21-25, 2019, R1-1901053, Agenda item: 7.2.4.1.5, Source: Samsung, Title: Considerations on Sidelink CSI. (Year: 2019).*
(Continued)

*Primary Examiner* — Peter G Solinsky
*Assistant Examiner* — Sanjay K Dewan
(74) *Attorney, Agent, or Firm* — BRYAN CAVE LEIGHTON PAISNER LLP

(57) ABSTRACT

An embodiment is a method for performing an operation for a first terminal in a wireless communication system, the method including the steps of: transmitting a PSCCH (Physical Sidelink Control Channel) including SCI (Sidelink Control Information) to a second terminal; and receiving an HARQ (Hybrid Automatic Repeat Request) feedback or a CSI (Channel State Information) report from the second terminal on the basis of the SCI, wherein the SCI includes information indicating that the second terminal is woken up during an OnDuration period, and information for requesting the HARQ feedback or the SCI report.

12 Claims, 19 Drawing Sheets

(58) Field of Classification Search
USPC .......................................................... 370/329
See application file for complete search history.

(56) References Cited

U.S. PATENT DOCUMENTS

| 2019/0208535 A1* | 7/2019 | Bergström | H04W 72/0446 |
| 2023/0089655 A1* | 3/2023 | Yeo | H04L 5/0092 |
| | | | 370/329 |

OTHER PUBLICATIONS

3GPP TSG RAN WG1 #98, Prague, CZ, Aug. 26-30, 2019, R1-1908223, Agenda Item: 7.2.4.5, Source: Fujitsu, Title: Discussion on physical layer procedure for NR V2X. (Year: 2019).*

3GPP TSG RAN WG1 meeting #98, Prague, Czech Republic, Aug. 26-30, 2019, R1-1909339, Agenda item: 7.2.9.1, Source: Nokia, Nokia Shanghai Bell, Title: PDCCH-based power saving signal/channel. (Year: 2019).*

3GPP TSG RAN WG1 #98, Prague, Czech, Aug. 26-30, 2019, R1-1909457, Agenda Item: 7.2.9.1, Source: Apple Inc., Title: PDCCH based power saving channel design for UE power saving. (Year: 2019).*

Samsung, "Considerations on Sidelink CSI", 3GPP TSG RAN WG1 Ad-Hoc Meeting 1901, Jan. 21-25, 2019, R1-1901053.

Fujitsu, "Discussion on physical layer procedure for NR V2X", 3GPP TSG RAN WG1 #98, Aug. 26-30, 2019, R1-1908223.

Nokia, Nokia Shanghai Bell, "PDCCH-based power saving signal/channel", 3GPP TSG RAN WG1 meeting #98, Aug. 26-30, 2019, R1-1909339.

Apple Inc., "PDCCH based power saving channel design for UE power saving", 3GPP TSG RAN WG1 #98, Aug. 26-30, 2019, R1-1909457.

* cited by examiner (a)

(b)

(a)

(b)

METHOD FOR TERMINAL TO TRANSMIT AND RECEIVE SIGNAL IN WIRELESS COMMUNICATION SYSTEM

CROSS-REFERENCE TO RELATED APPLICATIONS

This application is the National Stage filing under 35 U.S.C. 371 of International Application No. PCT/KR2020/013084, filed on Sep. 25, 2020, which claims the benefit of KR Patent Application No. 10-2019-0118404 filed on Sep. 25, 2019, the contents of which are all hereby incorporated by reference herein in their entirety.

TECHNICAL FIELD

The present disclosure relates to a wireless communication system, and more particularly to a power saving operation of a sidelink user equipment (UE).

BACKGROUND ART

Wireless communication systems have been widely deployed to provide various types of communication services such as voice or data. In general, a wireless communication system is a multiple access system that supports communication of multiple users by sharing available system resources (a bandwidth, transmission power, etc.). Examples of multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multi carrier frequency division multiple access (MC-FDMA) system.

A wireless communication system uses various radio access technologies (RATs) such as long term evolution (LTE), LTE-advanced (LTE-A), and wireless fidelity (WiFi). 5th generation (5G) is such a wireless communication system. Three key requirement areas of 5G include (1) enhanced mobile broadband (eMBB), (2) massive machine type communication (mMTC), and (3) ultra-reliable and low latency communications (URLLC). Some use cases may require multiple dimensions for optimization, while others may focus only on one key performance indicator (KPI). 5G supports such diverse use cases in a flexible and reliable way.

eMBB goes far beyond basic mobile Internet access and covers rich interactive work, media and entertainment applications in the cloud or augmented reality (AR). Data is one of the key drivers for 5G and in the 5G era, we may for the first time see no dedicated voice service. In 5G, voice is expected to be handled as an application program, simply using data connectivity provided by a communication system. The main drivers for an increased traffic volume are the increase in the size of content and the number of applications requiring high data rates. Streaming services (audio and video), interactive video, and mobile Internet connectivity will continue to be used more broadly as more devices connect to the Internet. Many of these applications require always-on connectivity to push real time information and notifications to users. Cloud storage and applications are rapidly increasing for mobile communication platforms. This is applicable for both work and entertainment. Cloud storage is one particular use case driving the growth of uplink data rates. 5G will also be used for remote work in the cloud which, when done with tactile interfaces, requires much lower end-to-end latencies in order to maintain a good user experience. Entertainment, for example, cloud gaming and video streaming, is another key driver for the increasing need for mobile broadband capacity. Entertainment will be very essential on smart phones and tablets everywhere, including high mobility environments such as trains, cars and airplanes. Another use case is augmented reality (AR) for entertainment and information search, which requires very low latencies and significant instant data volumes.

One of the most expected 5G use cases is the functionality of actively connecting embedded sensors in every field, that is, mMTC. It is expected that there will be 20.4 billion potential Internet of things (IoT) devices by 2020. In industrial IoT, 5G is one of areas that play key roles in enabling smart city, asset tracking, smart utility, agriculture, and security infrastructure.

URLLC includes services which will transform industries with ultra-reliable/available, low latency links such as remote control of critical infrastructure and self-driving vehicles. The level of reliability and latency are vital to smart-grid control, industrial automation, robotics, drone control and coordination, and so on.

Now, multiple use cases will be described in detail.

5G may complement fiber-to-the home (FTTH) and cable-based broadband (or data-over-cable service interface specifications (DOCSIS)) as a means of providing streams at data rates of hundreds of megabits per second to giga bits per second. Such a high speed is required for TV broadcasts at or above a resolution of 4K (6K, 8K, and higher) as well as virtual reality (VR) and AR. VR and AR applications mostly include immersive sport games. A special network configuration may be required for a specific application program. For VR games, for example, game companies may have to integrate a core server with an edge network server of a network operator in order to minimize latency.

The automotive sector is expected to be a very important new driver for 5G, with many use cases for mobile communications for vehicles. For example, entertainment for passengers requires simultaneous high capacity and high mobility mobile broadband, because future users will expect to continue their good quality connection independent of their location and speed. Other use cases for the automotive sector are AR dashboards. These display overlay information on top of what a driver is seeing through the front window, identifying objects in the dark and telling the driver about the distances and movements of the objects. In the future, wireless modules will enable communication between vehicles themselves, information exchange between vehicles and supporting infrastructure and between vehicles and other connected devices (e.g., those carried by pedestrians). Safety systems may guide drivers on alternative courses of action to allow them to drive more safely and lower the risks of accidents. The next stage will be remote-controlled or self-driving vehicles. These require very reliable, very fast communication between different self-driving vehicles and between vehicles and infrastructure. In the future, self-driving vehicles will execute all driving activities, while drivers are focusing on traffic abnormality elusive to the vehicles themselves. The technical requirements for self-driving vehicles call for ultra-low latencies and ultra-high reliability, increasing traffic safety to levels humans cannot achieve.

Smart cities and smart homes, often referred to as smart society, will be embedded with dense wireless sensor networks. Distributed networks of intelligent sensors will identify conditions for cost- and energy-efficient maintenance of the city or home. A similar setup can be done for each home, where temperature sensors, window and heating controllers, burglar alarms, and home appliances are all connected wirelessly. Many of these sensors are typically characterized by low data rate, low power, and low cost, but for example, real time high definition (HD) video may be required in some types of devices for surveillance.

The consumption and distribution of energy, including heat or gas, is becoming highly decentralized, creating the need for automated control of a very distributed sensor network. A smart grid interconnects such sensors, using digital information and communications technology to gather and act on information. This information may include information about the behaviors of suppliers and consumers, allowing the smart grid to improve the efficiency, reliability, economics and sustainability of the production and distribution of fuels such as electricity in an automated fashion. A smart grid may be seen as another sensor network with low delays.

The health sector has many applications that may benefit from mobile communications. Communications systems enable telemedicine, which provides clinical health care at a distance. It helps eliminate distance barriers and may improve access to medical services that would often not be consistently available in distant rural communities. It is also used to save lives in critical care and emergency situations. Wireless sensor networks based on mobile communication may provide remote monitoring and sensors for parameters such as heart rate and blood pressure.

Wireless and mobile communications are becoming increasingly important for industrial applications. Wires are expensive to install and maintain, and the possibility of replacing cables with reconfigurable wireless links is a tempting opportunity for many industries. However, achieving this requires that the wireless connection works with a similar delay, reliability and capacity as cables and that its management is simplified. Low delays and very low error probabilities are new requirements that need to be addressed with 5G Finally, logistics and freight tracking are important use cases for mobile communications that enable the tracking of inventory and packages wherever they are by using location-based information systems. The logistics and freight tracking use cases typically require lower data rates but need wide coverage and reliable location information.

A wireless communication system is a multiple access system that supports communication of multiple users by sharing available system resources (a bandwidth, transmission power, etc.). Examples of multiple access systems include a CDMA system, an TDMA system, a TDMA system, an OFDMA system, an SC-FDMA system, and an MC-FDMA system.

Sidelink (SL) refers to a communication scheme in which a direct link is established between user equipments (UEs) and the UEs directly exchange voice or data without intervention of a base station (BS). SL is considered as a solution of relieving the BS of the constraint of rapidly growing data traffic.

Vehicle-to-everything (V2X) is a communication technology in which a vehicle exchanges information with another vehicle, a pedestrian, and infrastructure by wired/wireless communication. V2X may be categorized into four types: vehicle-to-vehicle (V2V), vehicle-to-infrastructure (V2I), vehicle-to-network (V2N), and vehicle-to-pedestrian (V2P). V2X communication may be provided via a PC5 interface and/or a Uu interface.

As more and more communication devices demand larger communication capacities, there is a need for enhanced mobile broadband communication relative to existing RATs. Accordingly, a communication system is under discussion, for which services or UEs sensitive to reliability and latency are considered. The next-generation RAT in which eMBB, MTC, and URLLC are considered is referred to as new RAT or NR. In NR, V2X communication may also be supported.

FIG. 1 is a diagram illustrating V2X communication based on pre-NR RAT and V2X communication based on NR in comparison.

For V2X communication, a technique of providing safety service based on V2X messages such as basic safety message (BSM), cooperative awareness message (CAM), and decentralized environmental notification message (DENM) was mainly discussed in the pre-NR RAT. The V2X message may include location information, dynamic information, and attribute information. For example, a UE may transmit a CAM of a periodic message type and/or a DENM of an event-triggered type to another UE.

For example, the CAM may include basic vehicle information including dynamic state information such as a direction and a speed, vehicle static data such as dimensions, an external lighting state, path details, and so on. For example, the UE may broadcast the CAM which may have a latency less than 100 ms. For example, when an unexpected incident occurs, such as breakage or an accident of a vehicle, the UE may generate the DENM and transmit the DENM to another UE. For example, all vehicles within the transmission range of the UE may receive the CAM and/or the DENM. In this case, the DENM may have priority over the CAM.

In relation to V2X communication, various V2X scenarios are presented in NR. For example, the V2X scenarios include vehicle platooning, advanced driving, extended sensors, and remote driving.

For example, vehicles may be dynamically grouped and travel together based on vehicle platooning. For example, to perform platoon operations based on vehicle platooning, the vehicles of the group may receive periodic data from a leading vehicle. For example, the vehicles of the group may widen or narrow their gaps based on the periodic data.

For example, a vehicle may be semi-automated or full-automated based on advanced driving. For example, each vehicle may adjust a trajectory or maneuvering based on data obtained from a nearby vehicle and/or a nearby logical entity. For example, each vehicle may also share a dividing intention with nearby vehicles.

Based on extended sensors, for example, raw or processed data obtained through local sensor or live video data may be exchanged between vehicles, logical entities, UEs of pedestrians and/or V2X application servers. Accordingly, a vehicle may perceive an advanced environment relative to an environment perceivable by its sensor.

Based on remote driving, for example, a remote driver or a V2X application may operate or control a remote vehicle on behalf of a person incapable of driving or in a dangerous environment. For example, when a path may be predicted as in public transportation, cloud computing-based driving may be used in operating or controlling the remote vehicle. For example, access to a cloud-based back-end service platform may also be used for remote driving.

A scheme of specifying service requirements for various V2X scenarios including vehicle platooning, advanced driving, extended sensors, and remote driving is under discussion in NR-based V2X communication.

DISCLOSURE

Technical Problem

An object of the present disclosure is to provide a method for efficiently transmitting and receiving information for sidelink wireless connection monitoring by a sidelink UE supporting a power saving operation.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solutions

In accordance with an aspect of the present disclosure, a method for performing an operation for a first user equipment (UE) in a wireless communication system may include transmitting a PSCCH (Physical Sidelink Control Channel) including SCI (Sidelink Control Information) to a second user equipment (UE); and receiving HARQ (Hybrid Automatic Repeat Request) feedback or a CSI (Channel State Information) report from the second UE based on the SCI, wherein the SCI includes information indicating that the second UE is woken up during an OnDuration period, and information for requesting the HARQ feedback or the SCI report.

In accordance with another aspect of the present disclosure, a first user equipment (UE) for use in a wireless communication system may include at least one processor; and at least one computer memory operatively connected to the at least one processor, and configured to store instructions such that the at least one processor performs specific operations by executing the instructions, wherein the specific operations include: transmitting a PSCCH (Physical Sidelink Control Channel) including SCI (Sidelink Control Information) to a second user equipment (UE); and receiving HARQ (Hybrid Automatic Repeat Request) feedback or a CSI (Channel State Information) report from the second UE based on the SCI, wherein the SCI includes information indicating that the second UE is woken up during an OnDuration period, and information for requesting the HARQ feedback or the SCI report.

In accordance with another aspect of the present disclosure, a processor for performing operations for a user equipment (UE) in a wireless communication system may include performing the operations, wherein the operations include: transmitting a PSCCH (Physical Sidelink Control Channel) including SCI (Sidelink Control Information) to a second user equipment (UE); and receiving HARQ (Hybrid Automatic Repeat Request) feedback or a CSI (Channel State Information) report from the second UE based on the SCI, wherein the SCI includes information indicating that the second UE is woken up during an OnDuration period, and information for requesting the HARQ feedback or the SCI report.

In accordance with another aspect of the present disclosure, a computer-readable storage medium configured to store at least one computer program including instructions such that at least one processor performs specific operations for a user equipment (UE) by executing the instructions, the computer-readable storage medium may include performing the specific operations, wherein the specific operations include: transmitting a PSCCH (Physical Sidelink Control Channel) including SCI (Sidelink Control Information) to a second user equipment (UE); and receiving HARQ (Hybrid Automatic Repeat Request) feedback or a CSI (Channel State Information) report from the second UE based on the SCI, wherein the SCI includes information indicating that the second UE is woken up during an OnDuration period, and information for requesting the HARQ feedback or the SCI report.

The first UE may perform sidelink radio link monitoring using the HARQ feedback or the CSI report.

The first UE may not have traffic to be transmitted to the second UE.

The SCI may further include traffic indication information indicating that the first UE informs the second UE of absence of traffic to be transmitted to the second UE.

The PSCCH may include a paging RNTI (Radio Network Temporary Identifier) for the second UE.

The CSI may be transmitted before an offset period from a start time point of the OnDuration period.

Information about the offset period may be received from a base station (BS) through RRC signaling or system information.

Information about the offset period may be transmitted to the second UE.

The PSCCH may include a paging RNTI for the second UE, and the offset period is implicitly indicated using the paging RNTI.

The offset period may be implicitly indicated using a source ID of the second UE.

The SCI may be transmitted before the OnDuration period or within the OnDuration period.

The first UE may communicate with at least one of another UE, a terminal related to an autonomous vehicle, a base station (BS), and a network.

Advantageous Effects

As is apparent from the above description, the embodiments of the present disclosure can allow a sidelink UE supporting a power saving operation to transmit HARQ feedback or a CSI report, such that sidelink wireless connection monitoring can be effectively performed.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

DESCRIPTION OF DRAWINGS

The accompanying drawings, which are included to provide a further understanding of the disclosure, illustrate embodiments of the disclosure and together with the description serve to explain the principle of the disclosure. In the drawings.

BEST MODE

In various embodiments of the present disclosure, "/" and "," should be interpreted as "and/or". For example, "A/B" may mean "A and/or B". Further, "A, B" may mean "A and/or B". Further, "A/B/C" may mean "at least one of A, B and/or C". Further, "A, B, C" may mean "at least one of A, B and/or C".

In various embodiments of the present disclosure, "or" should be interpreted as "and/or". For example, "A or B" may include "only A", "only B", and/or "both A and B". In other words, "or" should be interpreted as "additionally or alternatively".

Techniques described herein may be used in various wireless access systems such as code division multiple access (CDMA), frequency division multiple access (FDMA), time division multiple access (TDMA), orthogonal frequency division multiple access (OFDMA), single carrier-frequency division multiple access (SC-FDMA), and so on. CDMA may be implemented as a radio technology such as universal terrestrial radio access (UTRA) or CDMA2000. TDMA may be implemented as a radio technology such as global system for mobile communications (GSM)/general packet radio service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, evolved-UTRA (E-UTRA), or the like. IEEE 802.16m is an evolution of IEEE 802.16e, offering backward compatibility with an IRRR 802.16e-based system. UTRA is a part of universal mobile telecommunications system (UMTS). 3rd generation partnership project (3GPP) long term evolution (LTE) is a part of evolved UMTS (E-UMTS) using evolved UTRA (E-UTRA). 3GPP LTE employs OFDMA for downlink (DL) and SC-FDMA for uplink (UL). LTE-advanced (LTE-A) is an evolution of 3GPP LTE.

A successor to LTE-A, 5th generation (5G) new radio access technology (NR) is a new clean-state mobile communication system characterized by high performance, low latency, and high availability. 5G NR may use all available spectral resources including a low frequency band below 1 GHz, an intermediate frequency band between 1 GHz and 10 GHz, and a high frequency (millimeter) band of 24 GHz or above.

While the following description is given mainly in the context of LTE-A or 5G NR for the clarity of description, the technical idea of an embodiment of the present disclosure is not limited thereto.

Hereinafter, V2X or SL (sidelink) communication will be described.

Figure 1:
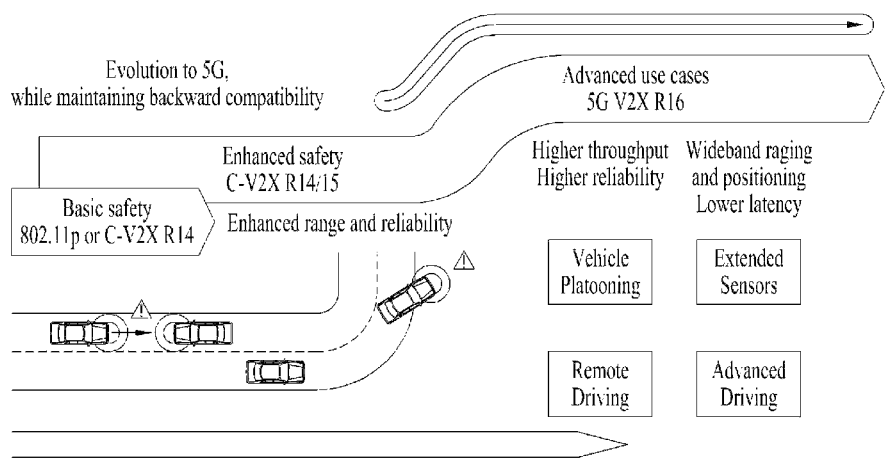
FIG. 1 is a diagram illustrating vehicle-to-everything (V2X) communication based on pre-new radio access technology (NR) RAT and V2X communication based on NR in comparison.
Figure 2:
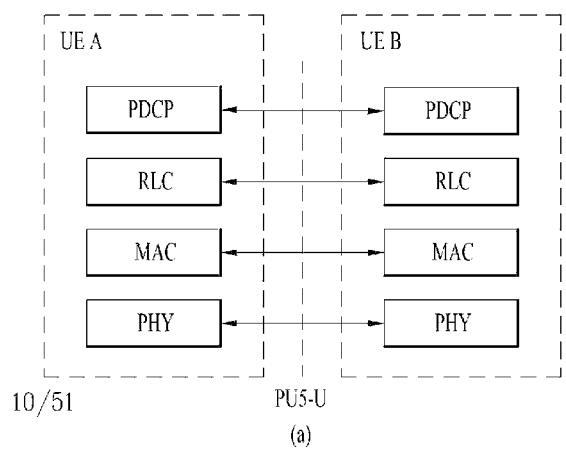
FIG. 2 is a diagram illustrating a radio protocol architecture for SL communication according to an embodiment of the present disclosure.
Figure 2:
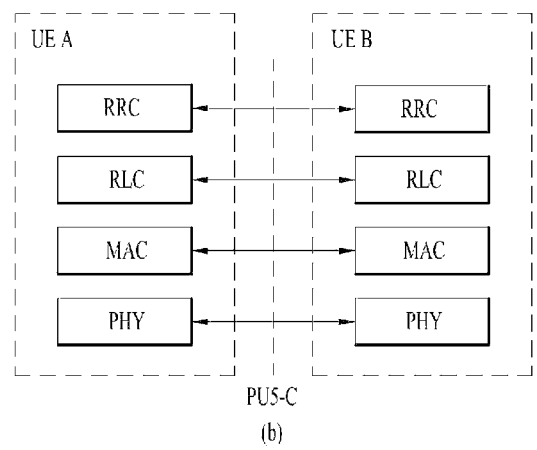

FIG. 2 illustrates a radio protocol architecture for SL communication according to an embodiment of the present disclosure. Specifically, FIG. 2(a) shows a user plane protocol stack of LTE, and FIG. 2(b) shows a control plane protocol stack of LTE.

Figure 3:
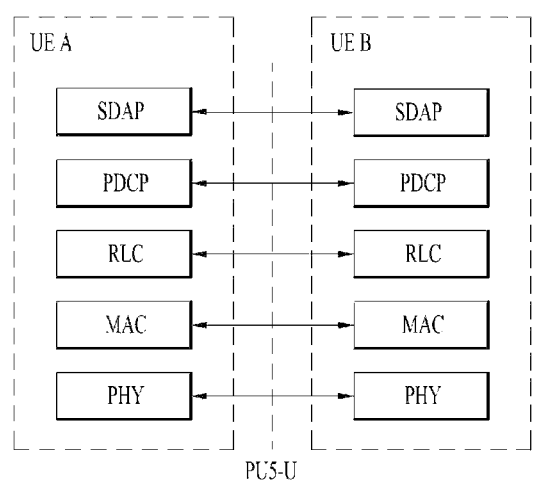
FIG. 3 is a diagram illustrating a radio protocol architecture for SL communication according to an embodiment of the present disclosure.
Figure 3:
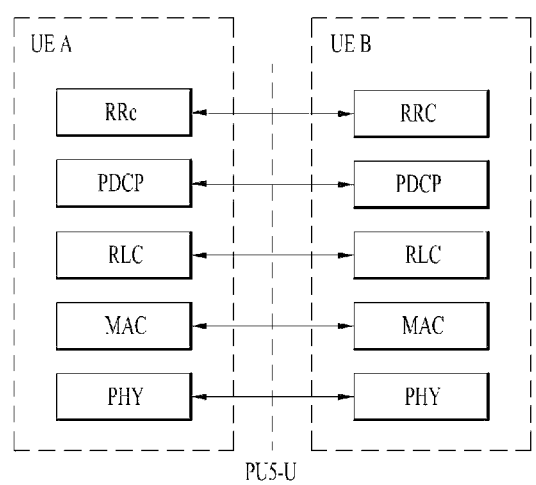

FIG. 3 illustrates a radio protocol architecture for SL communication according to an embodiment of the present disclosure. Specifically, FIG. 3(a) shows a user plane protocol stack of NR, and FIG. 3(b) shows a control plane protocol stack of NR.

Figure 4:
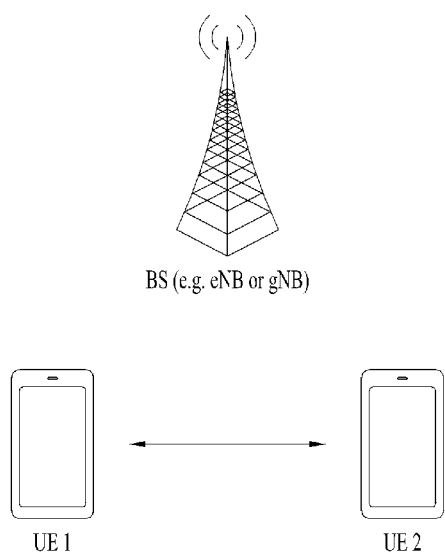
FIG. 4 is a diagram illustrating a user equipment (UE) for performing V2X or SL communication according to an embodiment of the present disclosure.

FIG. 4 illustrates UEs performing V2X or SL communication according to one embodiment of the present disclosure.

Referring to FIG. 4, in V2X or SL communication, the term UE may mainly refer to a user's UE. However, when network equipment such as a BS transmits and receives signals according to a communication scheme between UEs, the BS may also be regarded as a kind of UE. For example, UE 1 may be the first device 100, and UE 2 may be the second device 200.

For example, UE 1 may select a resource unit corresponding to a specific resource in a resource pool, which represents a set of resources. Then, UE 1 may transmit an SL signal through the resource unit. For example, UE 2, which is a receiving UE, may receive a configuration of a resource pool in which UE 1 may transmit a signal, and may detect a signal of UE 1 in the resource pool.

Here, when UE 1 is within the connection range of the BS, the BS may inform UE 1 of a resource pool. On the other hand, when the UE 1 is outside the connection range of the BS, another UE may inform UE 1 of the resource pool, or UE 1 may use a preconfigured resource pool.

In general, the resource pool may be composed of a plurality of resource units, and each UE may select one or multiple resource units and transmit an SL signal through the selected units.

Hereinafter, sidelink control information (SCI) will be described.

Control information transmitted by the BS to the UE on the PDCCH may be referred to as downlink control information (DCI), whereas control information transmitted by the UE to another UE on the PSCCH may be referred to as SCI. For example, before decoding the PSCCH, the UE may be aware of the start symbol of the PSCCH and/or the number of symbols of the PSCCH. For example, the SCI may include SL scheduling information. For example, the UE may transmit at least one SCI to another UE to schedule the PSSCH. For example, one or more SCI formats may be defined.

For example, the transmitting UE may transmit the SCI to the receiving UE on the PSCCH. The receiving UE may decode one SCI to receive the PSSCH from the transmitting UE.

For example, the transmitting UE may transmit two consecutive SCIs (e.g., 2-stage SCI) to the receiving UE on the PSCCH and/or the PSSCH. The receiving UE may decode the two consecutive SCIs (e.g., 2-stage SCI) to receive the PSSCH from the transmitting UE. For example, when the SCI configuration fields are divided into two groups in consideration of the (relatively) high SCI payload size, the SCI including a first SCI configuration field group may be referred to as first SCI or 1st SCI, and the SCI including a second SCI configuration field group may be referred to as second SCI or 2nd SCI. For example, the transmitting UE may transmit the first SCI to the receiving UE on the PSCCH. For example, the transmitting UE may transmit the second SCI to the receiving UE on the PSCCH and/or the PSSCH. For example, the second SCI may be transmitted to the receiving UE on the (independent) PSCCH, or may be piggybacked together with data and transmitted on the PSSCH. For example, the two consecutive SCIs may be applied for different transmissions (e.g., unicast, broadcast, or groupcast).

For example, the transmitting UE may transmit some or all of the following information to the receiving UE through SCI. Here, for example, the transmitting UE may transmit some or all of the following information to the receiving UE through the first SCI and/or the second SCI:

- PSSCH and/or PSCCH related resource allocation information, for example, the positions/number of time/frequency resources, resource reservation information (e.g., periodicity); and/or
- SL CSI report request indicator or SL (L1) RSRP (and/or SL (L1) RSRQ and/or SL (L1) RSSI) report request indicator; and/or
- SL CSI transmission indicator (or SL (L1) RSRP (and/or SL (L1) RSRQ and/or SL (L1) RSSI) information transmission indicator) (on PSSCH); and/or
- MCS information; and/or
- transmit power information; and/or
- L1 destination ID information and/or L1 source ID information; and/or
- SL HARQ process ID information; and/or
- new data indicator (NDI) information; and/or
- redundancy version (RV) information; and/or
- (transmission traffic/packet related) QoS information; e.g., priority information; and/or
- SL CSI-RS transmission indicator or information on the number of (transmitted) SL CSI-RS antenna ports;
- Location information about the transmitting UE or location (or distance/area) information about a target receiving UE (to which a request for SL HARQ feedback is made); and/or
- information about a reference signal (e.g., DMRS, etc.) related to decoding and/or channel estimation of data transmitted on the PSSCH, for example, information related to a pattern of a (time-frequency) mapping resource of DMRS, rank information, antenna port index information.

For example, the first SCI may include information related to channel sensing. For example, the receiving UE may decode the second SCI using the PSSCH DMRS. A polar code used for the PDCCH may be applied to the second SCI. For example, in the resource pool, the payload size of the first SCI may be the same for unicast, groupcast and broadcast. After decoding the first SCI, the receiving UE does not need to perform blind decoding of the second SCI. For example, the first SCI may include scheduling information about the second SCI.

In various embodiments of the present disclosure, since the transmitting UE may transmit at least one of SCI, the first SCI, and/or the second SCI to the receiving UE on the PSCCH, the PSCCH may be replaced/substituted with at least one of the SCI, the first SCI, and/or the second SCI. Additionally/alternatively, for example, the SCI may be replaced/substituted with at least one of the PSCCH, the first SCI, and/or the second SCI. Additionally/alternatively, for example, since the transmitting UE may transmit the second SCI to the receiving UE on the PSSCH, the PSSCH may be replaced/substituted with the second SCI.

Hereinafter, SL RLM (Radio Link Monitoring) will be described.

For unicast AS-level link management, SL RLM and/or radio link failure (RLF) declaration may be supported. In RLC acknowledged mode (SL AM) of SL unicast, the RLF declaration may be triggered by an indication from the RLC indicating that a maximum number of retransmissions has been reached. An AS-level link status (e.g., failure) may need to be known to a higher layer. Unlike the RLM procedure for unicast, a groupcast-related RLM design may not be considered. The RLM and/or RLF declaration may not be needed between group members for groupcast.

For example, the transmitting UE may transmit an RS to the receiving UE, and the receiving UE may perform SL RLM using the RS. For example, the receiving UE may declare an SL RLF using the RS. For example, the RS may be referred to as an SL RS.

SL measurement and reporting will be described below.

For the purpose of QoS prediction, initial transmission parameter setting, link adaptation, link management, admission control, and so on, SL measurement and reporting (e.g., an RSRP or an RSRQ) between UEs may be considered in SL. For example, the receiving UE may receive an RS from the transmitting UE and measure the channel state of the transmitting UE based on the RS. Further, the receiving UE may report CSI to the transmitting UE. SL-related measurement and reporting may include measurement and reporting of a CBR and reporting of location information. Examples of CSI for V2X include a channel quality indicator (CQI), a precoding matrix index (PMI), a rank indicator (RI), an RSRP, an RSRQ, a path gain/pathloss, an SRS resource indicator (SRI), a CSI-RS resource indicator (CRI), an interference condition, a vehicle motion, and the like. For unicast communication, a CQI, an RI and a PMI or a part of them may be supported in a non-subband-based aperiodic CSI report based on the assumption of four or fewer antenna ports. The CSI procedure may not depend on a standalone RS. CSI reporting may be activated and deactivated depending on a configuration.

For example, the transmitting UE may transmit a channel state information-reference signal (CSI-RS) to the receiving UE, and the receiving UE may measure a CQI or RI using the CSI-RS. For example, the CSI-RS may be referred to as an SL CSI-RS. For example, the CSI-RS may be confined to PSSCH transmission. For example, the transmitting UE may transmit the CSI-RS in PSSCH resources to the receiving UE.

Now, a HARQ procedure will be described.

An error compensation technique for ensuring communication reliability may include a forward error correction (FEC) scheme and an automatic repeat request (ARQ) scheme. In the FEC scheme, an error in a receiver may be corrected by adding an extra error correction code to information bits. Although the FEC scheme offers the benefits of a short time delay and no need for separately exchanging information between a transmitter and a receiver, the FEC scheme has decreased system efficiency in a good channel environment. The ARQ scheme may improve the transmission reliability. Despite the advantage, the ARQ scheme incurs a time delay and has decreased system efficiency in a poor channel environment.

HARQ is a combination of FEC and ARQ. In HARQ, it is determined whether data received in the PHY layer includes an error that is not decodable, and upon generation of an error, a retransmission is requested to thereby improve performance.

In SL unicast and groupcast, HARQ feedback and HARQ combining in the PHY layer may be supported. For example, when the receiving UE operates in resource allocation mode 1 or 2, the receiving UE may receive a PSSCH from the transmitting UE, and transmit HARQ feedback for the PSSCH in a sidelink feedback control information (SFCI) format on a physical sidelink feedback channel (PSFCH).

For example, SL HARQ feedback may be enabled for unicast. In this case, in a non-code block group (non-CBG) operation, when the receiving UE decodes a PSCCH directed to it and succeeds in decoding an RB related to the PSCCH, the receiving UE may generate a HARQ-ACK and transmit the HARQ-ACK to the transmitting UE. On the other hand, after the receiving UE decodes the PSCCH directed to it and fails in decoding the TB related to the PSCCH, the receiving UE may generate a HARQ-NACK and transmit the HARQ-NACK to the transmitting UE.

For example, SL HARQ feedback may be enabled for groupcast. For example, in a non-CBG operation, two HARQ feedback options may be supported for groupcast.

(1) Groupcast option 1: When the receiving UE decodes a PSCCH directed to it and then fails to decode a TB related to the PSCCH, the receiving UE transmits a HARQ-NACK on a PSFCH to the transmitting UE. On the contrary, when the receiving UE decodes the PSCCH directed to it and then succeeds in decoding the TB related to the PSCCH, the receiving UE may not transmit a HARQ-ACK to the transmitting UE.

(2) Groupcast option 2: When the receiving UE decodes a PSCCH directed to it and then fails to decode a TB related to the PSCCH, the receiving UE transmits a HARQ-NACK on a PSFCH to the transmitting UE. On the contrary, when the receiving UE decodes the PSCCH directed to it and then succeeds in decoding the TB related to the PSCCH, the receiving UE may transmit a HARQ-ACK to the transmitting UE on the PSFCH.

For example, when groupcast option 1 is used for SL HARQ feedback, all UEs performing groupcast communication may share PSFCH resources. For example, UEs belonging to the same group may transmit HARQ feedbacks in the same PSFCH resources.

For example, when groupcast option 2 is used for SL HARQ feedback, each UE performing groupcast communication may use different PSFCH resources for HARQ feedback transmission. For example, UEs belonging to the same group may transmit HARQ feedbacks in different PSFCH resources.

For example, when SL HARQ feedback is enabled for groupcast, the receiving UE may determine whether to transmit HARQ feedback to the transmitting UE based on a transmission-reception (TX-RX) distance and/or an RSRP.

For example, in the case of TX-RX distance-based HARQ feedback in groupcast option 1, when the TX-RX distance is less than or equal to a communication range requirement, the receiving UE may transmit HARQ feedback for the PSSCH to the transmitting UE. On the other hand, when the TX-RX distance is larger than the communication range requirement, the receiving UE may not transmit the HARQ feedback for the PSSCH to the transmitting UE. For example, the transmitting UE may inform the receiving UE of the location of the transmitting UE by SCI related to the PSSCH. For example, the SCI related to the PSSCH may be second SCI. For example, the receiving UE may estimate or obtain the TX-RX distance based on the locations of the receiving UE and the transmitting UE. For example, the receiving UE may decode the SCI related to the PSSCH, so as to know the communication range requirement used for the PSSCH.

For example, in resource allocation mode 1, a time between the PSFCH and the PSSCH may be configured or preconfigured. In unicast and groupcast, when a retransmission is needed on SL, this may be indicated to the BS by an in-coverage UE using a PUCCH. The transmitting UE may transmit an indication to its serving BS in the form of a scheduling request (SR)/buffer status report (BSR) instead of a HARQ ACK/NACK. Further, even though the BS fails to receive the indication, the BS may schedule SL retransmission resources for the UE. For example, in resource allocation mode 2, the time between the PSFCH and the PSSCH may be configured or preconfigured.

For example, from the viewpoint of transmission of a UE on a carrier, time division multiplexing (TDM) between a PSCCH/PSSCH and a PSFCH may be allowed for a PSFCH format for the SL in a slot. For example, a sequence-based PSFCH format with one symbol may be supported. The one symbol may not be an AGC period. For example, the sequence-based PSFCH format may be applied to unicast and groupcast.

For example, PSFCH resources may be preconfigured or periodically configured to span N slot periods in slots related to a resource pool. For example, N may be set to one or more values equal to or larger than 1. For example, N may be 1, 2 or 4. For example, a HARQ feedback for a transmission in a specific resource pool may be transmitted only on a PSFCH in the specific resource pool.

For example, when the transmitting UE transmits the PSSCH in slot #X to slot #N to the receiving UE, the receiving UE may transmit a HARQ feedback for the PSSCH in slot #(N+A) to the transmitting UE. For example, slot #(N+A) may include PSFCH resources. For example, A may be a smallest integer greater than or equal to K. For example, K may be the number of logical slots. In this case, K may be the number of slots in the resource pool. Alternatively, for example, K may be the number of physical slots. In this case, K may be the number of slots inside and outside the resource pool.

For example, when the receiving UE transmits a HARQ feedback in PSFCH resources in response to one PSSCH transmitted by the transmitting UE, the receiving UE may determine the frequency area and/or code area of the PSFCH resources based on an implicit mechanism in the configured resource pool. For example, the receiving UE may determine the frequency area and/or code area of the PSFCH resources based on at least one of a slot index related to the PSCCH/PSSCH/PSFCH, a subchannel related to the PSCCH/PSSCH, or an ID identifying each receiving UE in a group for HARQ feedback based on groupcast option 2. Additionally or alternatively, for example, the receiving UE may determine the frequency area and/or code area of the PSFCH resources based on at least one of an SL RSRP, a signal-to-interference and noise ratio (SINR), an L1 source ID, or location information.

For example, when a HARQ feedback transmission of the UE on the PSFCH overlaps with a HARQ feedback reception of the UE on the PSFCH, the UE may select either the HARQ feedback transmission on the PSFCH or the HARQ feedback reception on the PSFCH based on a priority rule. For example, the priority rule may be based on a minimum priority indication of the related PSCCH/PSSCH.

For example, when HARQ feedback transmissions of the UE for a plurality of UEs overlap with each other on the PSFCH, the UE may select a specific HARQ feedback transmission based on the priority rule. For example, the priority rule may be based on the minimum priority indication of the related PSCCH/PSSCH.

Hereinafter, discontinuous reception (DRX) for use in NR will be described in detail.

Figure 5:
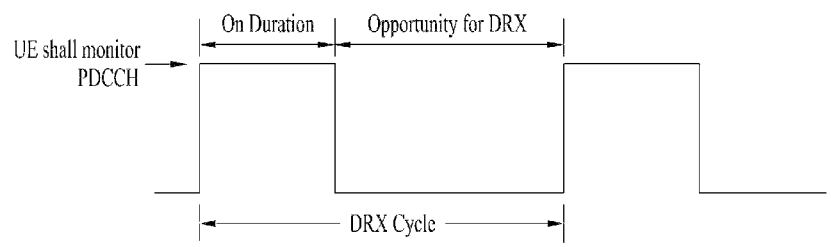
FIG. 5 is a diagram illustrating a discontinuous reception (DRX) operation according to an embodiment of the present disclosure.

Referring to FIG. 5, PDCCH monitoring activity of the UE in the RRC connected mode can be managed by DRX. When DRX is configured, the UE may discontinuously monitor the PDCCH. DRX has the following features:

on-duration: duration that the UE waits, after waking up, to receive the PDCCH. If the UE successfully decodes the PDCCH, the UE stays awake and starts an inactivity timer;

inactivity-timer: duration in which the UE waits to successfully decode the PDCCH from the last successful decoding of the PDCCH. The UE should restart the inactivity timer following single successful decoding of the PDCCH for first transmission only (i.e., not for retransmission);

retransmission timer: duration until retransmission is expected;

cycle: specifies periodic repetition of an on-duration and a period of inactivity.

active-time: the total period during which the UE monitors the PDCCH. This may include on-duration of the DRX cycle, a time for the UE to perform continuous reception while the deactivation timer has not expired, and a time for continuous reception while the UE waits for a retransmission opportunity.

Meanwhile, when the sidelink resource allocation mode 1 is set by RRC, the DRX function may not be configured.

Embodiments

Meanwhile, in NR V2X, the power saving operation of the UE is not supported, but it is necessary to support the DRX operation for power saving of the V2X UE. In this specification, a method for how a sidelink UE supporting a power saving operation in NR V2X performs a wake-up operation is proposed.

Therefore, according to an embodiment of the present disclosure, a method of a wake-up operation of a power saving UE in NR V2X, a BWP operation, and a device supporting the same are proposed.

The following proposals may be applied independently or may be applied together in various scenarios.

Proposal 1: The transmitting UE may include a wake-up bit and traffic indication information in a PSCCH (Physical Sidelink Control Channel) or SCI (Sidelink Control Information) either before the DRX OnDuration period of the receiving UE or within the DRX OnDuration period of the receiving UE, and may transmit the resultant information to the receiving UE.

The receiving UE wakes up immediately before or at the start of its own DRX OnDuration period and can check the wake-up bit and traffic indication information included in the SCI transmitted by the transmitting UE.

The time point at which the SCI including the wake-up bit and traffic indication information is transmitted (offset: information on the time point that is used to determine how many subframes will be used to wake up early and monitor SCI before the start point of DRX Onduration) is pre-configured or set by the base station (BS), so that the transmitting UE or the receiving UE can recognize the resultant time point information (through the system information). Alternatively, the BS may transmit the resultant information to the transmitting UE, so that the transmitting UE may inform the receiving UE of the corresponding information through a PC5 RRC signal. In addition, the transmitting UE can recognize a message transmission time point at which the transmitting UE transmits the message by referring to the DRX OnDuration start time of the receiving UE operating in the power saving mode and a wakeup time (offset information) at which the receiving UE wakes up to receive the SCI (i.e., SCI including the wake-up bit) from the transmitting UE.

In other words, the transmitting UE and/or the receiving UE may receive the DRX OnDuration period and offset information from the base station (BS) through the RRC signal or system information. The offset information is information about a time point at which the receiving UE monitors the SCI including the wake-up bit before the start time of the DRX OnDuration period.

Also, the offset information may be set to zero '0'. When the offset information is set to 0, the receiving UE may determine whether to be awake in the OnDuration period by receiving the SCI including the wake-up bit at the start time of DRX OnDuration or the start subframe of the OnDuration period.

In another embodiment, the transmitting UE and/or the receiving UE may not be configured with offset information from the BS. The transmitting UE and/or the receiving UE may receive information about a DRX OnDuration period from the BS through the RRC signal or system information. In addition, the receiving UE may determine whether to be awake in a subsequent OnDuration period by receiving the SCI including the wake-up bit at the start time of DRX OnDuration or the start subframe of the OnDuration period.

In addition, the receiving UE may receive the DRX OnDuration period and offset information from the BS through the RRC signal or system information, or may receive the DRX OnDuration period and offset information from the transmitting UE through the PC5 RRC signal.

Hereinafter, information that may be included in the SCI used to inform the power saving information for the receiving UE will be described.

Wake-up bit

1: The wake-up bit of 1 may instruct the receiving UE to awake in the DRX OnDuration period and receive a message from the transmitting UE.

0: The wake-up bit of 0 may instruct the receiving UE to sleep in the DRX OnDuration period by skipping the DRX OnDuration period Traffic Indication When the wake-up bit included in the SCI is set to ON, traffic indication information may be included in the SCI and transmitted to the receiving UE.

The traffic indication may be information indicating whether there is traffic to be transmitted from the transmitting UE to the receiving UE, and the transmitting UE may inform the receiving UE of the information about the presence or absence of such traffic.

The transmitting UE may include traffic indication information for one UE in the SCI, and may transmit the resultant SCI as needed. In addition, the transmitting UE may include traffic indication information for the plurality of UEs in the SCI, and may transmit the resultant SCI as needed.

Proposal 2: Proposal 2 proposes a method for allowing the BS or the transmitting UE to allocate a paging (or traffic indication) RNTI (for unicast, groupcast, and broadcast) to the receiving UE. In addition, a method for allowing the transmitting UE to include a wake-up bit and a paging (or traffic indication) RNTI of the receiving UE in the SCI and to transmit the resultant SCI to the receiving UE(s) is proposed.

The paging RNTI (or sidelink DRX RNTI) may be transmitted from the BS to the UE through a dedicated RRC message or a system information block (SIB).

According to Proposal 2, the receiving UE wakes up in the DRX OnDuration period upon receiving the SCI in which the wake-up bit including a paging RNTI of the receiving UE is set to ON. Otherwise (i.e., when the wake-up bit is set to OFF), the receiving UE may skip the DRX OnDuration period, and may operate in the sleep mode in the DRX OnDuration period.

The paging RNTI proposed in the present specification may be an identifier (ID) assigned to the receiving UE by either the BS or the transmitting UE so as to identify the receiving UE operating in a power saving mode. In addition, the paging RNTI described in the present specification may be variously referred to as a traffic indication RNTI, a power saving RNTI, or a sidelink DRX RNTI, but is not limited thereto. In addition, the paging RNTI described in this specification may include all identifiers for identifying the receiving UE operating in the power saving mode.

In another embodiment, when the receiving UE receives the SCI in which the wake-up bit including its source ID (source identifier, Source Layer 1 ID) is set to ON (i.e., when the transmitting UE includes a "layer 1 destination ID" in the SCI, allows the wake-up bit to be set to ON, and transmits the resultant information), the receiving UE wakes up in the DRX OnDuration period. Otherwise (i.e., when the wake-up bit is set to OFF), the receiving UE may skip the DRX OnDuration period and may operate in the sleep mode in the DRX OnDuration period.

Proposal 3: Proposal 3 proposes a method for allowing the transmitting UE to transmit SCI in which the wake-up bit is set to ON to the receiving UE for the purpose of PC5 RLM (PC5 Radio Link Monitoring).

The transmitting UE may not perform PC5 RLM if there is no signal to be sent to the receiving UE during a predetermined time or if it cannot continuously receive a signal from the receiving UE during a predetermined time. Accordingly, the transmitting UE may request HARQ feedback or a CSI report from the receiving UE for the purpose of PC5 RLM. At this time, the transmitting UE may set the wake-up bit of the SCI to "ON" so as to request HARQ feedback or a CSI report from the peer receiving UE operating in the power saving mode, and at the same time may set the resultant information including a bit for triggering the HARQ feedback or CSI report to "ON".

Figure 6:
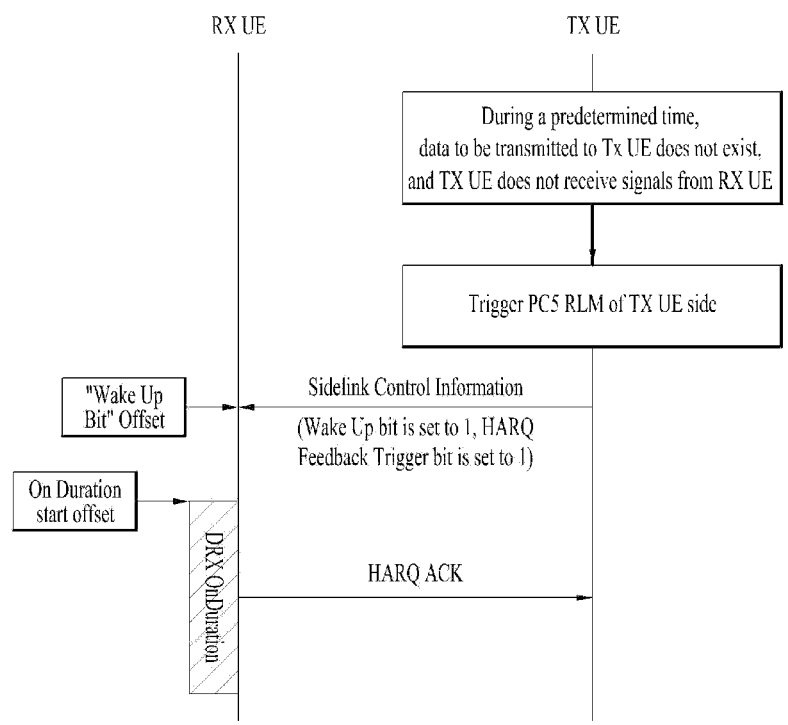
FIGS. 6 to 9 are flowcharts illustrating embodiment(s) of the present disclosure.

FIG. 6 is a diagram illustrating a method for allowing the transmitting UE to request HARQ feedback transmission for the purpose of SL RLM from the receiving UE for power saving.

Referring to FIG. 6, the transmitting UE may transmit an SCI including the wake-up bit and the HARQ feedback trigger bit to the receiving UE. In addition, the transmitting UE may transmit the SCI before the offset value begins from the start time of the DRX OnDuration period, upon receiving the offset information set by the RRC signal or system information from the BS. In addition, the SCI may include traffic indication information. For example, the wake-up bit included in the SCI may be set to '1', the traffic indication information may be set to '0', and the HARQ feedback trigger bit may be set to 1. That is, the SCI may include information indicating that the receiving UE wakes up in the DRX OnDuration period, indicates that there is no traffic to be transmitted, and indicates a HARQ feedback request.

The receiving UE may receive the SCI upon receiving offset information from the BS or the transmitting UE, before the offset value begins from the start time of the DRX OnDuration period. The receiving UE decodes the SCI and uses the wake-up bit to recognize whether to wake up in the DRX OnDuration period, and can recognize whether there is traffic to be received using the traffic indication information. In addition, the receiving UE may recognize whether to transmit the HARQ feedback using the HARQ feedback trigger bit. For example, when the wake-up bit included in the SCI is set to 1, the traffic indication information is set to 0, and the HARQ feedback trigger bit is set to 1, the receiving UE wakes up in the DRX OnDuration period and can recognize the absence of traffic to be received, and it can be seen that HARQ feedback should be transmitted to the transmitting UE.

In other words, the receiving UE wakes up in the period in which the SCI including the wake-up bit is transmitted before its own DRX OnDuration period begins, and can receive the SCI transmitted by the transmitting UE. The receiving UE, which has confirmed that the wake-up bit is set to ON in the SCI, can operate in an active state in the DRX OnDuration period without skipping the DRX OnDuration period. At this time, when the receiving UE confirms that the HARQ feedback report trigger bit is set to 1 in the SCI transmitted by the transmitting UE, the receiving UE may transmit the HARQ ACK feedback to the transmitting UE in the DRX OnDuration period.

The transmitting UE may perform SL RLM based on the HARQ feedback transmitted by the receiving UE. That is, the transmitting UE may instruct the receiving UE to transmit the HARQ feedback by setting the HARQ feedback trigger bit to 1 in the SCI. At this time, when the transmitting UE receives the HARQ ACK or HARQ NACK from the receiving UE, the IN Sync event is transmitted to the RRC layer. If the HARQ feedback is not received from the receiving UE, the Out of Sync event can be transmitted to the RRC layer.

The transmitting UE may perform SL RLM by transmitting consecutive SCIs in which the HARQ feedback trigger bit is set to 1 to the receiving UE. At this time, upon receiving consecutive HARQ ACK or HARQ NACK feedback from the receiving UE for the consecutive SCI (i.e., consecutive SCI in which the HARQ feedback trigger bit set to 1) transmitted by the transmitting UE (determined as consecutive IN Sync), the transmitting UE may determine that a PC5 connection state is normal. On the other hand, when the transmitting UE does not continuously receive the HARQ feedback from the receiving UE, the transmitting UE may determine the presence of consecutive Out-of-Sync and the occurrence of problems in a physical layer, so that the transmitting UE may operate the PC5 RLF timer or may declare PC5 RLF. Even during the PC5 RLF timer period, the transmitting UE may transmit consecutive SCI (consecutive SCI in which the HARQ feedback trigger bit is set to 1) to the receiving UE. When the transmitting UE does not receive consecutive HARQ ACK or HARQ NACK feedback from the receiving UE before the PC5 RLF timer expires, the transmitting UE may declare PC5 RLF.

In another embodiment, the transmitting UE may use the CSI Report to perform the PC5 RLM with the peer receiving UE operating in the power saving mode.

Figure 7:
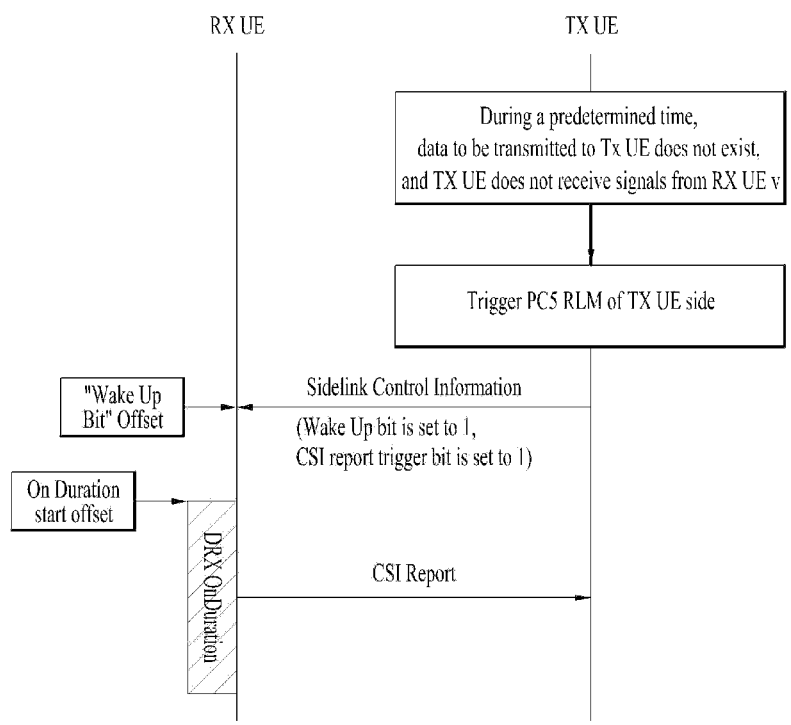

FIG. 7 is a flowchart illustrating a method for allowing the transmitting UE to request CSI report transmission from the power-saving receiving UE for SL RLM purposes.

Referring to FIG. 7, the transmitting UE may transmit an SCI including a wake-up bit and a CSI Report trigger bit to the receiving UE. In addition, the transmitting UE may transmit the SCI before the offset value begins from the start time of the DRX OnDuration period, upon receiving the offset information set by the RRC signal or system information from the base station. In addition, the SCI may include traffic indication information. For example, the wake-up bit included in the SCI may be set to 1, the traffic indication information may be set to 0, and the CSI Report trigger bit may be set to 1. That is, the SCI may include information indicating that the receiving UE wakes up in the DRX OnDuration period, indicates that there is no traffic to be transmitted, and indicates a CSI Report request.

The receiving UE may receive the SCI upon receiving offset information from the BS or the transmitting UE, before the offset value begins from the start time of the DRX OnDuration period. The receiving UE decodes the SCI and uses the wake-up bit to recognize whether to wake up in the DRX OnDuration period, and can recognize whether there is traffic to be received using the traffic indication information. In addition, the receiving UE may recognize whether to transmit the HARQ feedback using the HARQ feedback trigger bit. For example, when the wake-up bit included in the SCI is set to 1, the traffic indication information is set to 0, and the CSI report trigger bit is set to 1, the receiving UE wakes up in the DRX OnDuration period and can recognize the absence of traffic to be received, and it can be seen that HARQ feedback should be transmitted to the transmitting UE.

In other words, in order for the transmitting UE to request a CSI report from the peer receiving UE operating in a power saving mode, the transmitting UE may set the wake-up bit of the SCI to "ON", and at the same time may include a bit for triggering the CSI report in the SCI and then set the "ON" to the resultant information. The receiving UE wakes up in the period in which the SCI including the wake-up bit is transmitted before its own DRX OnDuration period begins, and can receive the SCI transmitted by the transmitting UE. The receiving UE, which has confirmed that the wake-up bit is set to ON in the SCI, can operate in an active state in the DRX OnDuration period without skipping the DRX OnDuration period. At this time, when the receiving UE confirms that the CSI report trigger bit is set to 1 in the SCI transmitted by the transmitting UE, the receiving UE may transmit the CSI report to the transmitting UE in the DRX OnDuration period.

The transmitting UE may perform SL RLM based on the HARQ feedback transmitted by the receiving UE. That is, the transmitting UE may instruct the receiving UE to transmit the CSI report by setting the CSI trigger bit to 1 in the SCI. At this time, when the transmitting UE receives the CSI report from the receiving UE, the IN Sync event is transmitted to the RRC layer. If the CSI report is not received from the receiving UE, the Out of Sync event can be transmitted to the RRC layer.

The transmitting UE may perform SL RLM by transmitting consecutive SCIs in which the CSI report trigger bit is set to 1 to the receiving UE. At this time, upon receiving consecutive CSI reports from the receiving UE for the consecutive SCI (i.e., consecutive SCI in which the CSI report trigger bit set to 1) transmitted by the transmitting UE (determined as consecutive IN Sync), the transmitting UE may determine that a PC5 connection state is normal. On the other hand, when the transmitting UE does not continuously receive the CSI report from the receiving UE, the transmitting UE may determine the presence of consecutive Out-of-Sync and the occurrence of problems in a physical layer, so that the transmitting UE may operate the PC5 RLF timer or may declare PC5 RLF. Even during the PC5 RLF timer period, the transmitting UE may transmit consecutive SCI (consecutive SCI in which the CSI report trigger bit is set to 1) to the receiving UE. When the transmitting UE does not receive consecutive CSI reports from the receiving UE before the PC5 RLF timer expires, the transmitting UE may declare PC5 RLF.

In another embodiment, the transmitting UE may request a HARQ feedback or a CSI Report by transmitting SCI within the DRX OnDuration period of the receiving UE for SL RLM purposes to the peer receiving UE operating in the power saving mode.

Figure 8:
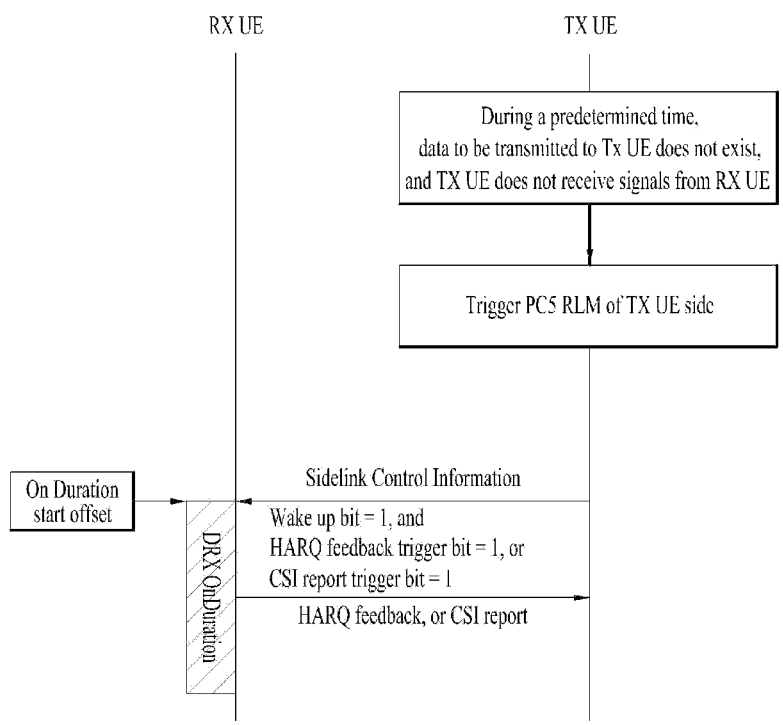

FIG. 8 is a flowchart illustrating a method for allowing the transmitting UE to request the HARQ feedback or the CSI report by transmitting an SCI in the DRX OnDuration period for SL RLM purposes to a receiving UE.

Referring to FIG. 8, the transmitting UE may transmit the SCI within the start time or the start subframe of the DRX OnDuration period of the receiving UE. In this case, the SCI may include the information described above.

Proposal 4: The receiving UE may implicitly calculate the offset information for receiving the SCI including the wake-up bit before the beginning of the DRX OnDuration period, based on paging (or a traffic indication) allocated by the transmitting UE, a source ID of the receiving UE, and a destination ID of the transmitting UE. That is, the receiving UE may calculate the subframe position at which the SCI including the wake-up bit should be received according to any one of the following equations.

1) Offset (subframe unit) indicating a time point at which the SCI including the wake-up bit is transmitted or received="DRX Cycle" modulo paging RNTI (or Sidelink DRX RNTI)"

2) Offset (subframe unit) indicating a time point at which the SCI including the wake-up bit is transmitted or received=Source ID (Layer 1 ID, Layer 2 ID, or application ID) of "DRX Cycle" modulo receiving UE"

3) Offset (subframe unit) indicating a time point at which the SCI including the wake-up bit is transmitted or received=Destination ID (Layer 1 ID, Layer 2 ID, or application ID) of "DRX Cycle" modulo transmitting UE"

For example, if the value obtained by the above equation is '2', the receiving UE can wake up in the sleep mode to receive the SCI including the wake-up bit transmitted by the transmitting UE at a time point earlier than the start offset of its own DRX OnDuration period. In addition, the transmitting UE may transmit the SCI including the wake-up bit at a time point that is 2 subframes earlier than the start offset of its own sidelink DRX OnDuration, so that the receiving UE can wake up in the sleep mode. In this case, it may be assumed that the sidelink DRX OnDuration period of the transmitting UE and the sidelink DRX OnDuration period of the receiving UE are synchronized.

In another embodiment, when the SCI can be transmitted within the sidelink DRX OnDuration period, the receiving UE can wake up in the sleep mode to receive the SCI including the wake-up bit transmitted by the transmitting UE after lapse of 2 subframes from the start time point of the sidelink DRX OnDuration period. In addition, the transmitting UE may transmit the SCI including the wake-up bit to the receiving UE after lapse of 2 subframes from the start time of its own sidelink DRX OnDuration period, so that the receiving UE can wake up in the sleep mode. In this case, it may be assumed that the sidelink DRX OnDuration period of the transmitting UE and the sidelink DRX OnDuration period of the receiving UE are synchronized.

The transmitting UE may determine a transmission time at which the SCI including the wake-up bit will be transmitted to the receiving UE by referring to an offset value calculated by the above equation based on information (DRX OnDuration start offset, DRX cycle, a paging RNTI of the receiving UE, a source ID of the receiving UE, or a destination ID of the transmitting UE) about the receiving UE.

Figure 9:
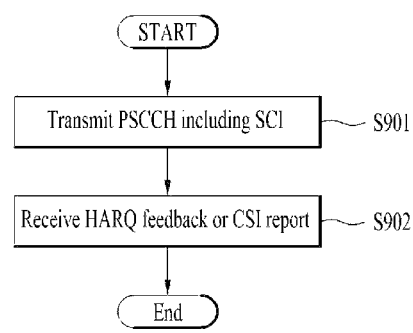

FIG. 9 is a diagram for explaining one embodiment(s) of the content proposed in the present specification.

Referring to FIG. 9, a first UE may transmit a PSCCH including the SCI to a second UE (S901). The SCI may include information indicating whether the second UE will awake during the OnDuration period, and information for requesting HARQ feedback or CSI report.

In general, when the first UE does not have traffic to be transmitted to the second UE, this means that that the first UE does not awake in the OnDuration period. However, the sidelink UE may significantly consider the sidelink radio link monitoring operation and the sidelink radio link failure operation that are used to determine normal connection between the sidelink UEs. In more detail, since the sidelink UEs move frequently, the sidelink UEs cannot perform normal sidelink communication when a radio link between the sidelink UEs is severed. Therefore, even when the first UE does not have traffic or data to be transmitted to the second UE, for the purpose of monitoring the sidelink radio connection, it is indicated that the first UE will awake in the OnDuration period, the HARQ feedback or CSI report can be requested, and the resultant information is included in the SCI so that the resultant SCI can be transmitted to the second UE. In addition, the first UE may further include traffic indication information indicating that there is no traffic to be transmitted from the first UE to the second UE, in the SCI. For example, if the first UE requests HARQ feedback for sidelink radio link monitoring even though there is no traffic to be transmitted to the second terminal, the first UE may transmit dummy information or the like to the second UE during the OnDuration period. In addition, the second UE may receive dummy information and the like, and may transmit the HARQ feedback to the first UE in response to the received dummy information or the like.

In addition, the SCI may be transmitted through a PSCCH, and the PSCCH may include a paging RNTI for the second UE. The second UE may identify the received PSCCH using its own paging RNTI. In addition, the SCI may be received before or within the DRX OnDuration period. When SCI is received before the DRX OnDuration period, the corresponding information can be transmitted before the offset period begins from the start time point of the DRX OnDuration period. Information about the offset period may be received from the BS through RRC signaling or system information, and the information about the offset period may be delivered to the second UE. Alternatively, the information about the offset period may be implicitly indicated using the paging RNTI or the source ID of the second UE.

In addition, the first UE may receive the HARQ feedback or CSI report from the second UE (S902). The first UE may perform sidelink radio link monitoring using the HARQ feedback or CSI report.

According to an embodiment of the present disclosure, the V2X receiving UE operating in the power saving mode may allow the V2X receiving UE to recognize a message transmission time point where the V2X receiving UE will transmit the message, so that the V2X receiving UE can well receive the message transmitted by the V2X transmitting UE. In addition, the V2X transmitting UE can transmit a message to the V2X receiving UE by referring to both the DRX OnDuration start time of the V2X receiving UE operating in the power saving mode and information (offset) about a wake-up time at which the V2X receiving UE wakes up to receive the SCI (i.e., SCI including the wake-up bit) from the transmitting UE. As a result, the V2X receiving UE operating in the power saving mode can stably receive a message transmitted by the V2X transmitting UE without missing the message transmitted by the V2X transmitting UE. In addition, even when there is no traffic to be transmitted to the receiving UE operating in the power saving mode, the transmitting UE can request and receive the HARQ feedback or CSI report for the sidelink radio link monitoring operation, so that the transmitting UE can smoothly perform the operation of monitoring the sidelink radio link connected to the receiving UE operating in the power saving mode.

Since examples of the above-described proposals can also be used as implementation methods of the present disclosure, it will also be apparent that the examples of the above-described proposals may be considered to be a kind of proposed methods. Although the above-described proposals can be implemented independently from each other, it should be noted that the above-described proposals can also be implemented as a combination (or a merged format) of some proposals. For example, although the proposed method has been disclosed based on the 3GPP NR system for convenience of description, a system to which the proposed method is applied may also be extended to another system other than the 3GPP NR system. For example, the proposed methods of the present disclosure may also be extendedly applied for D2D communication. Here, D2D communication indicates that a UE communicates with a different UE directly using a radio channel. Herein, although the UE refers to a user equipment (UE), when a network device such as a BS (or eNB) transmits and/or receives a signal according to a communication scheme between UEs, the UE may also be regarded as a sort of the UE. In addition, the proposed methods of the present disclosure may be limitedly applied only to MODE 3 V2X operation (and/or MODE 4 V2X operation). In addition, the proposed methods of the present disclosure may be limitedly applied only to a preconfigured (/signaled) (specific) V2X channel (/signal) transmission (e.g., PSSCH (and/or (interlinked) PSCCH and/or PSBCH)). In addition, the proposed methods of the present disclosure may be limitedly applied only to the case that a PSSCH and an (interlinked) PSCCH are adjacently (and/or non-adjacently) transmitted (on a frequency domain) (and/or a transmission based on a preconfigured (/signaled) MCS (and/or coding rate and/or resource block) (value (/range)) is performed). In addition, the proposed methods of the present disclosure may be limitedly applied only to MODE #3 (and/or MODE #4) V2X carrier (and/or (MODE #4 (/3) sidelink (/uplink) SPS (and/or sidelink (/uplink) dynamic scheduling) carrier). In addition, the proposed methods of the present document may be (limitedly) applied only if a synchronization signal (transmission (and/or reception)) resource position and/or a number (and/or V2X resource pool-related subframe position and/or number (and/or subchannel size and/or number)) are the same (and/or (some) different) between carriers. As an example, the proposed schemes of the present disclosure can be extended and applied to V2X communication between the BS and the UE. For example, the proposed schemes of the present disclosure may be limited only to UNICAST (sidelink) communication (and/or MULTICAST (or GROUPCAST) (sidelink) communication and/or BROADCAST (sidelink) communication).

Examples of Communication Systems Applicable to the Present Disclosure

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 10:
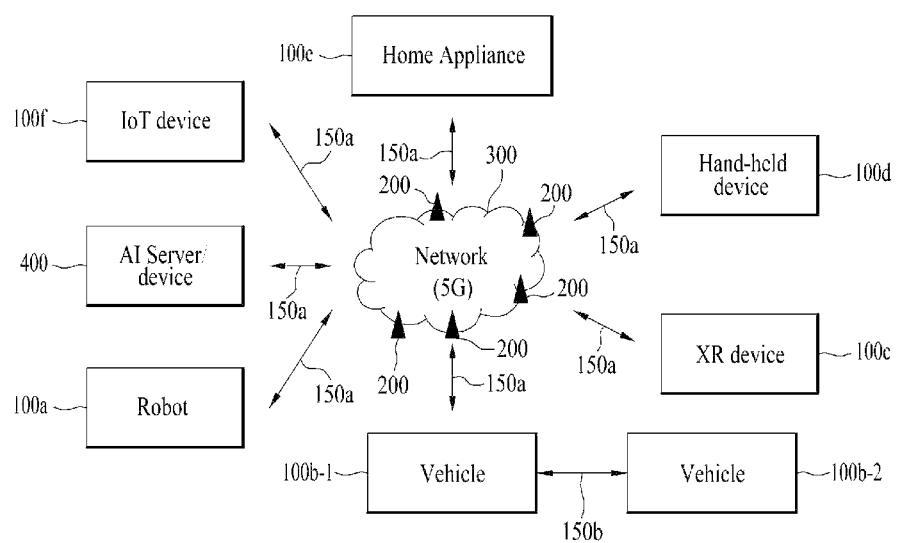
FIGS. 10 to 19 are block diagrams illustrating various devices applicable to embodiment(s) of the present disclosure.

FIG. 10 illustrates a communication system applied to the present disclosure.

Referring to FIG. 10, a communication system applied to the present disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100*a*, vehicles 100*b*-1 and 100*b*-2, an eXtended Reality (XR) device 100*c*, a hand-held device 100*d*, a home appliance 100*e*, an Internet of Things (IoT) device 100*f*, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200*a* may operate as a BS/network node with respect to other wireless devices.

The wireless devices 100*a* to 100*f* may be connected to the network 300 via the BSs 200. An AI technology may be applied to the wireless devices 100*a* to 100*f* and the wireless devices 100*a* to 100*f* may be connected to the AI server 400 via the network 300. The network 300 may be configured using a 3G network, a 4G (e.g., LTE) network, or a 5G (e.g., NR) network. Although the wireless devices 100*a* to 100*f* may communicate with each other through the BSs 200/network 300, the wireless devices 100*a* to 100*f* may perform direct communication (e.g., sidelink communication) with each other without passing through the BSs/network. For example, the vehicles 100*b*-1 and 100*b*-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100*a* to 100*f*.

Wireless communication/connections 150*a*, 150*b*, or 150*c* may be established between the wireless devices 100*a* to 100*f*/BS 200, or BS 200/BS 200. Herein, the wireless communication/connections may be established through various RATs (e.g., 5G NR) such as uplink/downlink communication 150*a*, sidelink communication 150*b* (or, D2D communication), or inter BS communication (e.g., relay, Integrated Access Backhaul (IAB)). The wireless devices and the BSs/the wireless devices may transmit/receive radio signals to/from each other through the wireless communication/connections 150*a* and 150*b*. For example, the wireless communication/connections 150*a* and 150*b* may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Example of Wireless Devices to which the Present Disclosure is Applied

Figure 11:
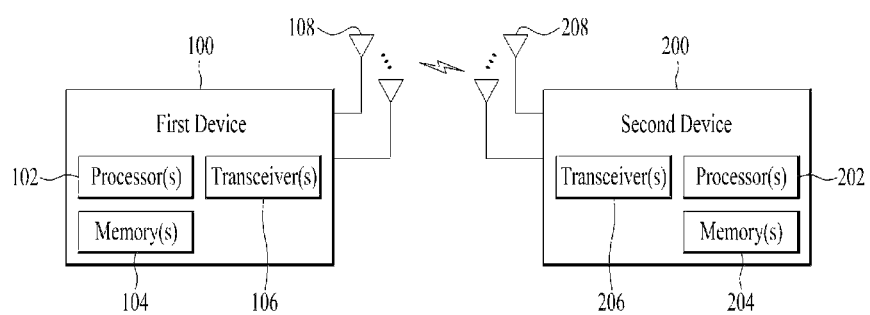

FIG. 11 illustrates wireless devices applicable to the present disclosure.

Referring to FIG. 11, a first wireless device 100 and a second wireless device 200 may transmit radio signals through a variety of RATs (e.g., LTE and NR). Herein, {the first wireless device 100 and the second wireless device 200} may correspond to {the wireless device 100*x* and the BS 200} and/or {the wireless device 100*x* and the wireless device 100*x*} of FIG. 10.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Here, wireless communication technologies implemented in the wireless devices (XXX, YYY) of the present disclosure may include LTE, NR, and 6G, as well as Narrowband Internet of Things for low power communication. At this time, for example, the NB-IoT technology may be an example of a Low Power Wide Area Network (LPWAN) technology, and may be implemented in standards such as LTE Cat NB1 and/or LTE Cat NB2, and is not limited to the above-described names. Additionally or alternatively, the wireless communication technology implemented in the wireless devices (XXX, YYY) of the present disclosure may perform communication based on LTE-M technology. In this case, as an example, the LTE-M technology may be an example of LPWAN technology, and may be referred to by various names such as eMTC (enhanced machine type communication). For example, LTE-M technology may be implemented in at least one of a variety of standards, such as 1) LTE CAT 0, 2) LTE Cat M1, 3) LTE Cat M2, 4) LTE non-BL (non-Bandwidth Limited), 5) LTE-MTC, 6) LTE Machine Type Communication, and/or 7) LTE M, and is not limited to the above-described names. Additionally or alternatively, the wireless communication technology implemented in the wireless devices (XXX, YYY) of the present disclosure is at least one of ZigBee, Bluetooth, and Low Power Wide Area Network (LPWAN) considering low power communication, and is not limited to the above-described names. As an example, ZigBee technology can generate personal area networks (PANs) related to small/low-power digital communication based on various standards such as IEEE 802.15.4, and may be called various names.

Example of a Signal Process Circuit to which the Present Disclosure is Applied

Figure 12:
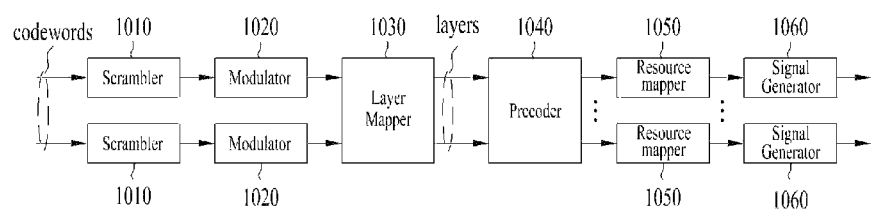

FIG. 12 illustrates a signal process circuit for a transmission signal.

Referring to FIG. 12, a signal processing circuit 1000 may include scramblers 1010, modulators 1020, a layer mapper 1030, a precoder 1040, resource mappers 1050, and signal generators 1060. An operation/function of FIG. 12 may be performed, without being limited to, the processors 102 and 202 and/or the transceivers 106 and 206 of FIG. 11. Hardware elements of FIG. 12 may be implemented by the processors 102 and 202 and/or the transceivers 106 and 206 of FIG. 11. For example, blocks 1010 to 1060 may be implemented by the processors 102 and 202 of FIG. 11. Alternatively, the blocks 1010 to 1050 may be implemented by the processors 102 and 202 of FIG. 11 and the block 1060 may be implemented by the transceivers 106 and 206 of FIG. 11.

Codewords may be converted into radio signals via the signal processing circuit 1000 of FIG. 12. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 12. For example, the wireless devices (e.g., 100 and 200 of FIG. 11) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Figure 13:
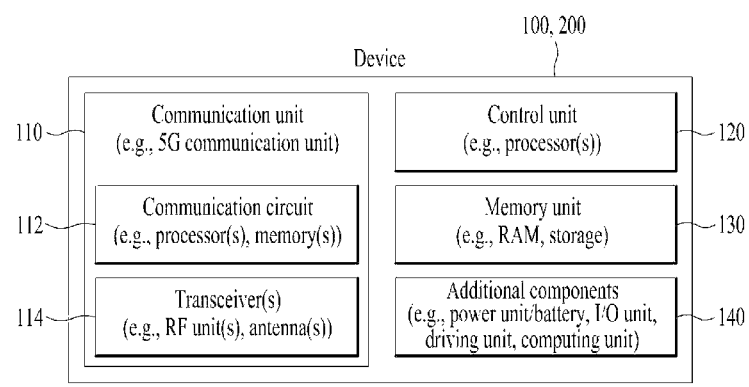

Application Example of a Wireless Device to which the Present Disclosure is Applied FIG. 13 illustrates another example of a wireless device applied to the present disclosure. The wireless device may be implemented in various forms according to a use-case/service (refer to FIG. 10).

Referring to FIG. 13, wireless devices 100 and 200 may correspond to the wireless devices 100 and 200 of FIG. 11 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 11. For example, the transceiver(s) 114 may include the one or more transceivers 106 and 206 and/or the one or more antennas 108 and 208 of FIG. 11. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 10), the vehicles (100b-1 and 100b-2 of FIG. 10), the XR device (100c of FIG. 10), the hand-held device (100d of FIG. 10), the home appliance (100e of FIG. 10), the IoT device (100f of FIG. 10), a digital broadcast UE, a hologram device, a public safety device, an MTC device, a medicine device, a fintech device (or a finance device), a security device, a climate/environment device, the AI server/device (400 of FIG. 10), the BSs (200 of FIG. 10), a network node, etc. The wireless device may be used in a mobile or fixed place according to a use-example/service.

In FIG. 13, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 13 will be described in detail with reference to the drawings.

Example of Hand-Held Device to which the Present Disclosure is Applied

Figure 14:
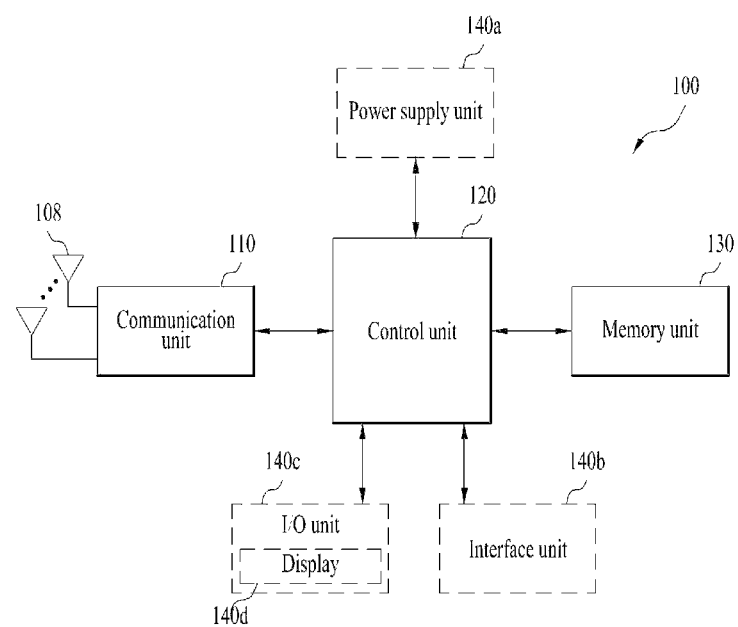

FIG. 14 illustrates a hand-held device applied to the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user UE (UT), a Mobile Subscriber Station (MSS), a Subscriber Station (SS), an Advanced Mobile Station (AMS), or a Wireless UE (WT).

Referring to FIG. 14, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. 13, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

Figure 15:
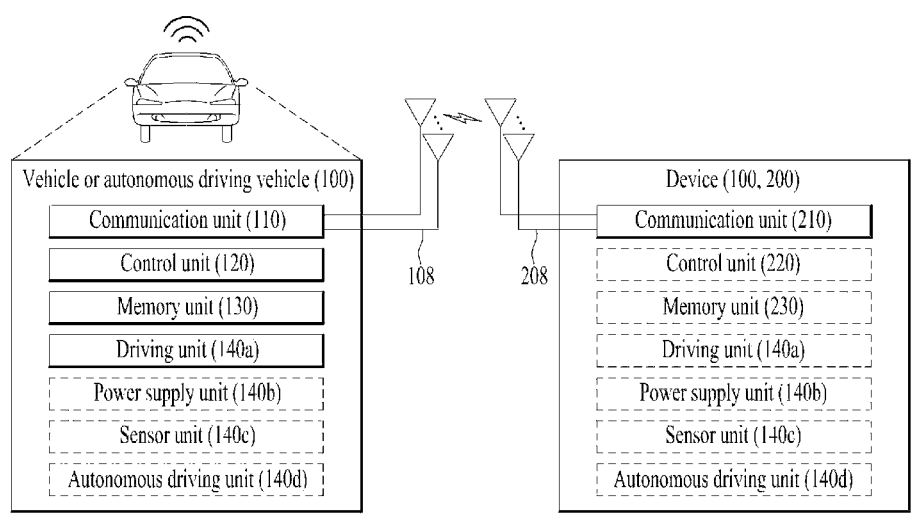

Example of a Vehicle or an Autonomous Driving Vehicle to which the Present Disclosure is Applied FIG. 15 illustrates a vehicle or an autonomous driving vehicle applied to the present disclosure. The vehicle or autonomous driving vehicle may be implemented by a mobile robot, a car, a train, a manned/unmanned Aerial Vehicle (AV), a ship, etc.

Referring to FIG. 15, a vehicle or autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 13, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an Electronic Control Unit (ECU). The driving unit 140a may cause the vehicle or the autonomous driving vehicle 100 to drive on a road. The driving unit 140a may include an engine, a motor, a powertrain, a wheel, a brake, a steering device, etc. The power supply unit 140b may supply power to the vehicle or the autonomous driving vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140*a* such that the vehicle or the autonomous driving vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140*c* may obtain a vehicle state and/or surrounding environment information. The autonomous driving unit 140*d* may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous driving vehicles and provide the predicted traffic information data to the vehicles or the autonomous driving vehicles.

Examples of AR/VR and Vehicle to which the Present Disclosure is Applied

Figure 16:
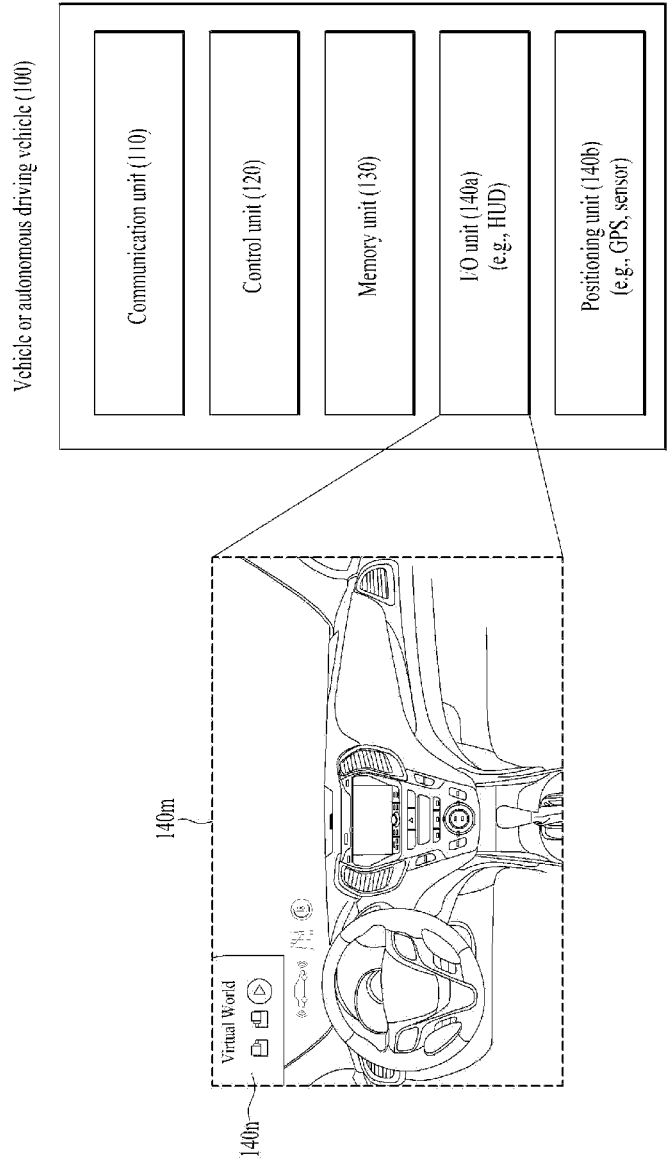

FIG. 16 illustrates a vehicle applied to the present disclosure. The vehicle may be implemented as a transport means, an aerial vehicle, a ship, etc.

Referring to FIG. 16, a vehicle 100 may include a communication unit 110, a control unit 120, a memory unit 130, an I/O unit 140*a*, and a positioning unit 140*b*. Herein, the blocks 110 to 130/140*a* and 140*b* correspond to blocks 110 to 130/140 of FIG. 13.

The communication unit 110 may transmit and receive signals (e.g., data and control signals) to and from external devices such as other vehicles or BSs. The control unit 120 may perform various operations by controlling constituent elements of the vehicle 100. The memory unit 130 may store data/parameters/programs/code/commands for supporting various functions of the vehicle 100. The I/O unit 140*a* may output an AR/VR object based on information within the memory unit 130. The I/O unit 140*a* may include an HUD. The positioning unit 140*b* may acquire information about the position of the vehicle 100. The position information may include information about an absolute position of the vehicle 100, information about the position of the vehicle 100 within a traveling lane, acceleration information, and information about the position of the vehicle 100 from a neighboring vehicle. The positioning unit 140*b* may include a GPS and various sensors.

As an example, the communication unit 110 of the vehicle 100 may receive map information and traffic information from an external server and store the received information in the memory unit 130. The positioning unit 140*b* may obtain the vehicle position information through the GPS and various sensors and store the obtained information in the memory unit 130. The control unit 120 may generate a virtual object based on the map information, traffic information, and vehicle position information and the I/O unit 140*a* may display the generated virtual object in a window in the vehicle (1410 and 1420). The control unit 120 may determine whether the vehicle 100 normally drives within a traveling lane, based on the vehicle position information. If the vehicle 100 abnormally exits from the traveling lane, the control unit 120 may display a warning on the window in the vehicle through the I/O unit 140*a*. In addition, the control unit 120 may broadcast a warning message regarding driving abnormity to neighboring vehicles through the communication unit 110. According to situation, the control unit 120 may transmit the vehicle position information and the information about driving/vehicle abnormality to related organizations.

Examples of XR Device to which the Present Disclosure is Applied

Figure 17:
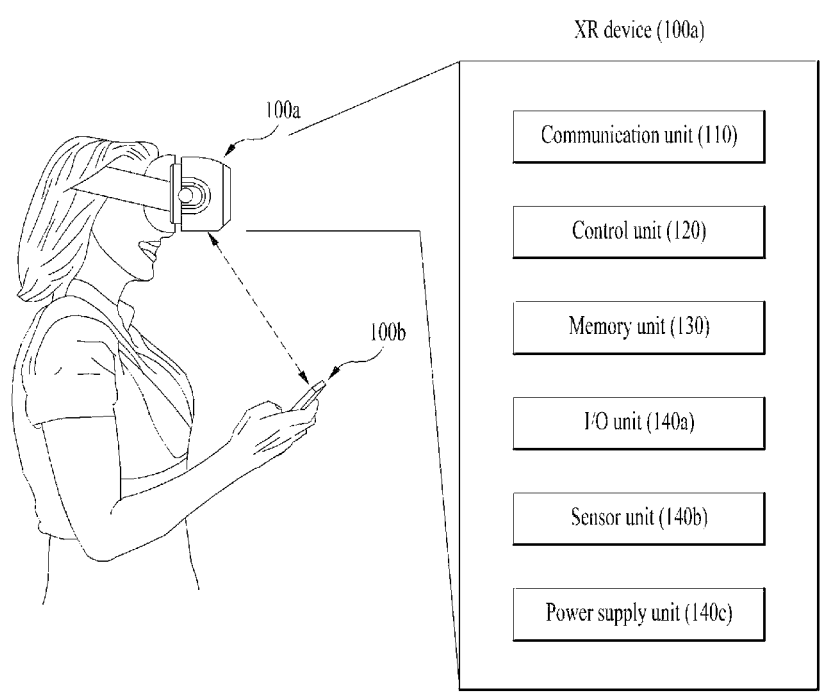

FIG. 17 illustrates an XR device applied to the present disclosure. The XR device may be implemented by an HMD, an HUD mounted in a vehicle, a television, a smartphone, a computer, a wearable device, a home appliance, a digital signage, a vehicle, a robot, etc.

Referring to FIG. 17, an XR device 100*a* may include a communication unit 110, a control unit 120, a memory unit 130, an I/O unit 140*a*, a sensor unit 140*b*, and a power supply unit 140*c*. Herein, the blocks 110 to 130/140*a* to 140*c* correspond to the blocks 110 to 130/140 of FIG. 13, respectively.

The communication unit 110 may transmit and receive signals (e.g., media data and control signals) to and from external devices such as other wireless devices, hand-held devices, or media servers. The media data may include video, images, and sound. The control unit 120 may perform various operations by controlling constituent elements of the XR device 100*a*. For example, the control unit 120 may be configured to control and/or perform procedures such as video/image acquisition, (video/image) encoding, and metadata generation and processing. The memory unit 130 may store data/parameters/programs/code/commands needed to drive the XR device 100*a*/generate XR object. The I/O unit 140*a* may obtain control information and data from the exterior and output the generated XR object. The I/O unit 140*a* may include a camera, a microphone, a user input unit, a display unit, a speaker, and/or a haptic module. The sensor unit 140*b* may obtain an XR device state, surrounding environment information, user information, etc. The sensor unit 140*b* may include a proximity sensor, an illumination sensor, an acceleration sensor, a magnetic sensor, a gyro sensor, an inertial sensor, an RGB sensor, an IR sensor, a fingerprint recognition sensor, an ultrasonic sensor, a light sensor, a microphone and/or a radar. The power supply unit 140*c* may supply power to the XR device 100*a* and include a wired/wireless charging circuit, a battery, etc.

For example, the memory unit 130 of the XR device 100*a* may include information (e.g., data) needed to generate the XR object (e.g., an AR/VR/MR object). The I/O unit 140*a* may receive a command for manipulating the XR device 100*a* from a user and the control unit 120 may drive the XR device 100*a* according to a driving command of a user. For example, when a user desires to watch a film or news through the XR device 100*a*, the control unit 120 transmits content request information to another device (e.g., a hand-held device 100*b*) or a media server through the communication unit 130. The communication unit 130 may download/stream content such as films or news from another device (e.g., the hand-held device 100*b*) or the media server to the memory unit 130. The control unit 120 may control and/or perform procedures such as video/image acquisition, (video/image) encoding, and metadata generation/processing with respect to the content and generate/output the XR object based on information about a surrounding space or a real object obtained through the I/O unit 140*a*/sensor unit 140*b*.

The XR device 100*a* may be wirelessly connected to the hand-held device 100*b* through the communication unit 110 and the operation of the XR device 100*a* may be controlled by the hand-held device 100*b*. For example, the hand-held device 100*b* may operate as a controller of the XR device 100*a*. To this end, the XR device 100*a* may obtain information about a 3D position of the hand-held device 100b and generate and output an XR object corresponding to the hand-held device 100b.

Examples of Robot to which the Present Disclosure is Applied

Figure 18:
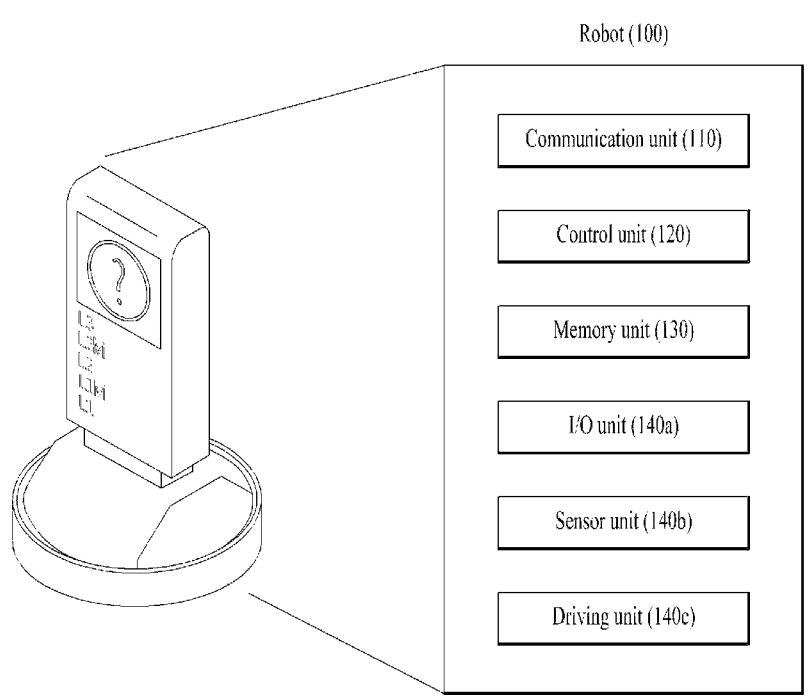

FIG. 18 illustrates a robot applied to the present disclosure. The robot may be categorized into an industrial robot, a medical robot, a household robot, a military robot, etc., according to a used purpose or field.

Referring to FIG. 18, a robot 100 may include a communication unit 110, a control unit 120, a memory unit 130, an I/O unit 140a, a sensor unit 140b, and a driving unit 140c. Herein, the blocks 110 to 130/140a to 140c correspond to the blocks 110 to 130/140 of FIG. 13, respectively.

The communication unit 110 may transmit and receive signals (e.g., driving information and control signals) to and from external devices such as other wireless devices, other robots, or control servers. The control unit 120 may perform various operations by controlling constituent elements of the robot 100. The memory unit 130 may store data/parameters/programs/code/commands for supporting various functions of the robot 100. The I/O unit 140a may obtain information from the exterior of the robot 100 and output information to the exterior of the robot 100. The I/O unit 140a may include a camera, a microphone, a user input unit, a display unit, a speaker, and/or a haptic module. The sensor unit 140b may obtain internal information of the robot 100, surrounding environment information, user information, etc. The sensor unit 140b may include a proximity sensor, an illumination sensor, an acceleration sensor, a magnetic sensor, a gyro sensor, an inertial sensor, an IR sensor, a fingerprint recognition sensor, an ultrasonic sensor, a light sensor, a microphone, a radar, etc. The driving unit 140c may perform various physical operations such as movement of robot joints. In addition, the driving unit 140c may cause the robot 100 to travel on the road or to fly. The driving unit 140c may include an actuator, a motor, a wheel, a brake, a propeller, etc.

Examples of AI Device to which the Present Disclosure is Applied

Figure 19:
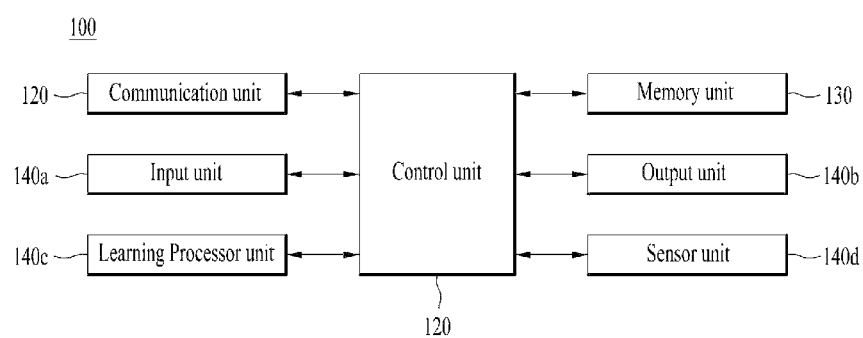

FIG. 19 illustrates an AI device applied to the present disclosure. The AI device may be implemented by a fixed device or a mobile device, such as a TV, a projector, a smartphone, a PC, a notebook, a digital broadcast UE, a tablet PC, a wearable device, a Set Top Box (STB), a radio, a washing machine, a refrigerator, a digital signage, a robot, a vehicle, etc.

Referring to FIG. 19, an AI device 100 may include a communication unit 110, a control unit 120, a memory unit 130, an I/O unit 140a/140b, a learning processor unit 140c, and a sensor unit 140d. The blocks 110 to 130/140a to 140d correspond to blocks 110 to 130/140 of FIG. 13, respectively.

The communication unit 110 may transmit and receive wired/radio signals (e.g., sensor information, user input, learning models, or control signals) to and from external devices such as other AI devices (e.g., 100x, 200, or 400 of FIG. 10) or an AI server (e.g., 400 of FIG. 10) using wired/wireless communication technology. To this end, the communication unit 110 may transmit information within the memory unit 130 to an external device and transmit a signal received from the external device to the memory unit 130.

The control unit 120 may determine at least one feasible operation of the AI device 100, based on information that is determined or generated using a data analysis algorithm or a machine learning algorithm. The control unit 120 may perform an operation determined by controlling constituent elements of the AI device 100. For example, the control unit 120 may request, search, receive, or use data of the learning processor unit 140c or the memory unit 130 and control the constituent elements of the AI device 100 to perform a predicted operation or an operation determined to be preferred among at least one feasible operation. The control unit 120 may collect history information including the operation contents of the AI device 100 and operation feedback by a user and store the collected information in the memory unit 130 or the learning processor unit 140c or transmit the collected information to an external device such as an AI server (400 of FIG. 10). The collected history information may be used to update a learning model.

The memory unit 130 may store data for supporting various functions of the AI device 100. For example, the memory unit 130 may store data obtained from the input unit 140a, data obtained from the communication unit 110, output data of the learning processor unit 140c, and data obtained from the sensor unit 140. The memory unit 130 may store control information and/or software code needed to operate/drive the control unit 120.

The input unit 140a may acquire various types of data from the exterior of the AI device 100. For example, the input unit 140a may acquire learning data for model learning, and input data to which the learning model is to be applied. The input unit 140a may include a camera, a microphone, and/or a user input unit. The output unit 140b may generate output related to a visual, auditory, or tactile sense. The output unit 140b may include a display unit, a speaker, and/or a haptic module. The sensing unit 140 may obtain at least one of internal information of the AI device 100, surrounding environment information of the AI device 100, and user information, using various sensors. The sensor unit 140 may include a proximity sensor, an illumination sensor, an acceleration sensor, a magnetic sensor, a gyro sensor, an inertial sensor, an RGB sensor, an IR sensor, a fingerprint recognition sensor, an ultrasonic sensor, a light sensor, a microphone, and/or a radar.

The learning processor unit 140c may learn a model consisting of artificial neural networks, using learning data. The learning processor unit 140c may perform AI processing together with the learning processor unit of the AI server (400 of FIG. 10). The learning processor unit 140c may process information received from an external device through the communication unit 110 and/or information stored in the memory unit 130. In addition, an output value of the learning processor unit 140c may be transmitted to the external device through the communication unit 110 and may be stored in the memory unit 130.

INDUSTRIAL APPLICABILITY

The above-mentioned embodiments of the present disclosure are applicable to various mobile communication systems.

The invention claimed is:

1. A method for performing an operation for a first user equipment (UE) in a wireless communication system comprising:
    transmitting a PSCCH (Physical Sidelink Control Channel) including SCI (Sidelink Control Information) to a second user equipment (UE);
    receiving HARQ (Hybrid Automatic Repeat Request) feedback or a CSI (Channel State Information) report from the second UE based on the SCI; and performing sidelink radio link monitoring based on the HARQ feedback or the CSI report, wherein the SCI includes information indicating that the second UE is to wake up during an OnDuration period, and information for requesting the HARQ feedback or the CSI report during the OnDuration period, and wherein the SCI is transmitted based on that the first UE has no PSSCH to be sent to the second UE during a predetermined time.

2. The method according to claim 1, wherein:
the SCI further includes traffic indication information indicating an absence of traffic to be transmitted to the second UE.

3. The method according to claim 1, wherein:
the PSCCH includes a paging RNTI (Radio Network Temporary Identifier) for the second UE.

4. The method according to claim 1, wherein:
the SCI is transmitted before an offset period from a start time point of the OnDuration period.

5. The method according to claim 4, wherein:
information about the offset period is received from a base station (BS) through RRC signaling or system information.

6. The method according to claim 5, wherein:
information about the offset period is transmitted to the second UE.

7. The method according to claim 4, wherein:
the PSCCH includes a paging RNTI for the second UE; and
the offset period is implicitly indicated using the paging RNTI.

8. The method according to claim 4, wherein:
the offset period is implicitly indicated using a source ID of the second UE.

9. A first user equipment (UE) for use in a wireless communication system comprising:
at least one processor; and
at least one computer memory operatively connected to the at least one processor, and configured to store instructions such that the at least one processor performs specific operations by executing the instructions,
wherein the specific operations include:
transmitting a PSCCH (Physical Sidelink Control Channel) including SCI (Sidelink Control Information) to a second user equipment (UE);
receiving HARQ (Hybrid Automatic Repeat Request) feedback or a CSI (Channel State Information) report from the second UE based on the SCI; and
performing sidelink radio link monitoring based on the HARQ feedback or the CSI report,
wherein the SCI includes information indicating that the second UE is to wake up during an OnDuration period, and information for requesting the HARQ feedback or the CSI report during the OnDuration period, and
wherein the SCI is transmitted based on that the first UE has no PSSCH to be sent to the second UE during a predetermined time.

10. The first user equipment (UE) according to claim 9, wherein:
the first UE is configured to communicate with at least one of another UE, a terminal related to an autonomous vehicle, a base station (BS), and a network.

11. A processor for performing operations for a user equipment (UE) in a wireless communication system comprising:
performing the operations,
wherein the operations include:
transmitting a PSCCH (Physical Sidelink Control Channel) including SCI (Sidelink Control Information) to a second user equipment (UE);
receiving HARQ (Hybrid Automatic Repeat Request) feedback or a CSI (Channel State Information) report from the second UE based on the SCI; and
performing sidelink radio link monitoring based on the HARQ feedback or the CSI report,
wherein the SCI includes information indicating that the second UE is to wake up during an OnDuration period, and information for requesting the HARQ feedback or the CSI report during the OnDuration period, and
wherein the SCI is transmitted based on that the first UE has no PSSCH to be sent to the second UE during a predetermined time.

12. A computer-readable storage medium configured to store at least one computer program including instructions such that at least one processor performs specific operations for a user equipment (UE) by executing the instructions, the computer-readable storage medium comprising:
performing the specific operations,
wherein the specific operations include:
transmitting a PSCCH (Physical Sidelink Control Channel) including SCI (Sidelink Control Information) to a second user equipment (UE);
receiving HARQ (Hybrid Automatic Repeat Request) feedback or a CSI (Channel State Information) report from the second UE based on the SCI; and
performing sidelink radio link monitoring based on the HARQ feedback or the CSI report,
wherein the SCI includes information indicating that the second UE is to wake up during an OnDuration period, and information for requesting the HARQ feedback or the CSI report during the OnDuration period, and
wherein the SCI is transmitted based on that the first UE has no PSSCH to be sent to the second UE during a predetermined time.

* * * * *